United States Patent
Yamanaka et al.

(10) Patent No.: US 7,324,673 B1
(45) Date of Patent: Jan. 29, 2008

(54) IMAGE PROCESSING APPARATUS, IMAGE PROCESSING METHOD, AND IMAGE PROCESSING PROGRAM STORAGE MEDIUM

(75) Inventors: Takatoshi Yamanaka, Kawasaki (JP); Kohei Murao, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 429 days.

(21) Appl. No.: 09/714,292

(22) Filed: Nov. 17, 2000

(30) Foreign Application Priority Data

Nov. 19, 1999 (JP) ................................. 11-329571
Oct. 25, 2000 (JP) ............................. 2000-325269

(51) Int. Cl.
*G06K 9/00* (2006.01)
(52) U.S. Cl. .......................... 382/128; 386/44; 358/520
(58) Field of Classification Search ................ 382/128, 382/132, 274; 386/44; 358/520
See application file for complete search history.

(56) References Cited

U.S. PATENT DOCUMENTS

| | | | |
|---|---|---|---|
| 5,533,142 A * | 7/1996 | Takeo | 382/128 |
| 5,982,953 A * | 11/1999 | Yanagita et al. | 382/294 |
| 6,314,198 B1 * | 11/2001 | Ogura | 382/132 |
| 6,502,984 B2 * | 1/2003 | Ogura et al. | 378/206 |
| 6,542,579 B1 * | 4/2003 | Takasawa | 378/165 |
| 6,577,753 B2 * | 6/2003 | Ogawa | 382/132 |
| 6,671,394 B1 * | 12/2003 | Sako | 382/132 |

FOREIGN PATENT DOCUMENTS

| | | |
|---|---|---|
| JP | 04-187142 | 7/1992 |
| JP | A 06-169908 | 6/1994 |
| JP | A 6-48604 | 7/1994 |
| JP | A 07-306938 | 11/1995 |
| JP | 08111816 A * | 4/1996 |
| JP | A 08-146540 | 6/1996 |
| JP | A 09-147099 | 6/1997 |
| JP | A 09-266901 | 10/1997 |
| JP | A 10-143627 | 5/1998 |
| JP | 10-283475 | 10/1998 |

* cited by examiner

*Primary Examiner*—Matthew C. Bella
*Assistant Examiner*—Shefali Patel
(74) *Attorney, Agent, or Firm*—Staas & Halsey LLP

(57) ABSTRACT

There is disclosed an image processing apparatus for performing an image processing on a medical image represented by digital data in a medical field, and the appropriate image processing is performed with respect to various medical images. An image processing condition suitable for a photography condition is stored beforehand in an image processing condition storing section 218, and an image processing section 212 subjects the medical image to an image processing based on the image processing condition suitable for the photography condition when the medical image is obtained.

11 Claims, 35 Drawing Sheets

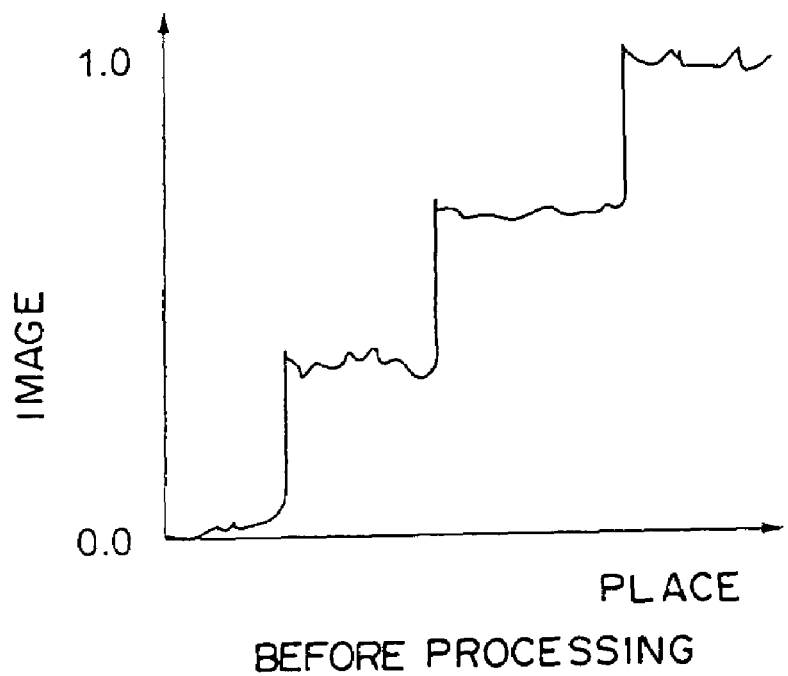
Fig. 6(A) BEFORE PROCESSING
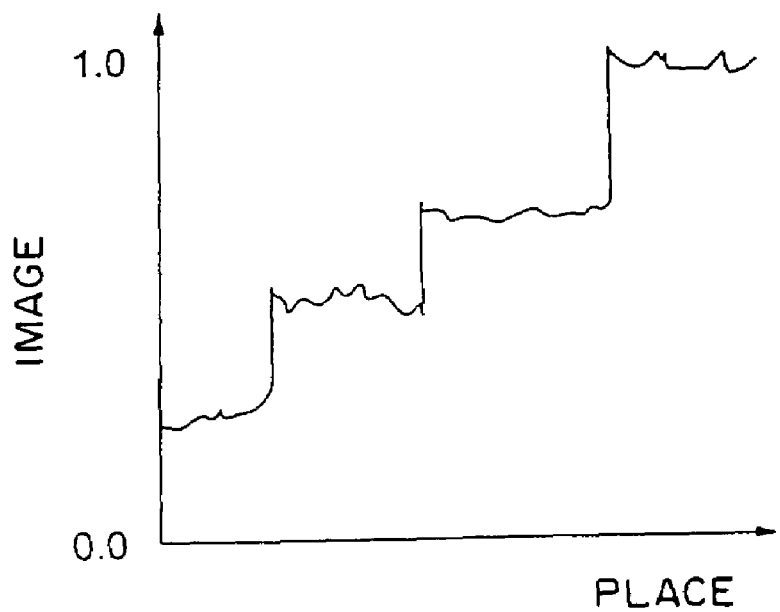
Fig. 6(B) AFTER PROCESSING

IMAGE PROCESSING APPARATUS, IMAGE PROCESSING METHOD, AND IMAGE PROCESSING PROGRAM STORAGE MEDIUM

BACKGROUND OF THE INVENTION i) Field of the Invention

The present invention relates to an image processing apparatus and an image processing method for subjecting a medical image represented by digital data in a medical field to an image processing, and an image processing program storage medium in which an image processing program for operating a computer system as such image processing apparatus is stored.

ii) Description of Related Art

With a medical progress and a rapid progress of an information processing technique, digitization of a medical image has been advanced, social basis has been prepared and importance of medical image diagnosis has increased. Reading of a simple radiograph (image diagnosis) has heretofore been performed by a method of outputting an image to a film and diagnosing the image. In this method, diagnosis expenses (direct expenses of a film, film bag, and the like and managing/working expenses) associated with film operation are required, output of a plurality of films is sometimes needed in accordance with an image diagnosis purpose, and considerable cost-up problems such as a diagnosis expense increase and diagnosis time increase arise.

From now on, it is expected that it is essential in future to use a CRT monitor on a computer, observe an image and read the image (diagnose the image). In this case, an image quality level equivalent to or higher than that of the film is required.

When a chest image or another simple radiograph is displayed as it is by the CRT monitor, digital data of the simple radiograph outputted from a computed radiography (CR) photography device is original image data dependent on the device, or image data having no contrast and being unsuitable for medical image diagnosis. Additionally, the CR photography device itself is constituted in consideration of a film property, and a problem occurs that the image data is not formed by considering any CRT monitor.

Therefore, it is proposed to perform an image processing in such a manner that an image suitable for diagnosis is executed and to display the image subjected to the image processing for diagnosis instead of displaying the image as it is on the CRT monitor.

Additionally, to handle various medical images, an image processing condition is adjusted in such a manner that a satisfactory image can be obtained for a certain medical image (e.g., a chest simple radiograph), but an image unsuitable for diagnosis is obtained for another medical image (e.g., mammography), and there is a problem that it is remarkably difficult to set an image processing condition.

Moreover, even with a medical image photography device of the same device type, the setting condition for photography of the medical image photography device differs with a hospital in which the medical image photography device is installed, or there is a difference in a hospital doctor's liking and experience in observation, and in this case it is a problem to provide individual hospitals or individual users with the medical image easy to observe.

Furthermore, for example, it is also a problem to present an area of interest as an image easy to see, or to present an image suitable for observation of symmetry when the symmetry of a human body is to be observed.

SUMMARY OF THE INVENTION

The present invention has been developed in consideration of the aforementioned circumstances, and an object thereof is to provide an image processing apparatus and an image processing method by which a processing suitable for observation can be performed with respect to various medical images, and an image processing program storage medium in which an image processing program for operating a computer system as the image processing apparatus is stored.

To achieve the aforementioned object according to the present invention there is provided an image processing apparatus for subjecting a medical image to an image processing, comprising:

an image processing condition storing section for storing an image processing condition when the medical image is subjected to the image processing in accordance with a photography device type and a photography condition when the medical image is obtained;

a data obtaining section for obtaining the medical image, and the photography device type and the photography condition when the medical image is obtained; and an image processing section for reading the image processing condition for the same photography device type and photography condition as the photography device type and photography condition obtained by the data obtaining section from the image processing condition storing section, and subjecting the medical image obtained by the data obtaining section to the image processing in accordance with the read image processing condition.

For the image processing apparatus of the present invention, when the image processing condition is stored beforehand in accordance with the photography device type and photography condition for obtaining the medical image as described above, and the medical image is subjected to the image processing, the image processing is performed in accordance with the image processing condition adapted to the medical image, various medical images are subjected to respective appropriate image processings, and an image suitable for diagnosis can be obtained with respect to any medical image.

Here, in the image processing apparatus of the present invention, the image processing section subjects the medical image obtained by the data processing section to at least a gradation conversion processing and a frequency emphasis processing, and the image processing condition storing section preferably stores a frequency emphasis function indicating a degree of frequency emphasis in which a gradation conversion function and an average density around respective points of the medical image are used as variables in accordance with the photography device type and the photography condition.

When a gradation processing is performed using the gradation conversion function in accordance with the photography device type and photography condition, and a frequency emphasis processing is performed using the frequency emphasis function indicating the degree of frequency emphasis with the densities of the respective points of the medical image used as the variables, the image suitable for diagnosis can be obtained.

Furthermore, in the image processing apparatus of the present invention, before the gradation conversion processing, the image processing section preferably subjects the medical image obtained by the data obtaining section to a luminance correction processing using a dynamic range compression function in which the average density around the respective points of the medical image is used as the variable.

For example, when a chest image or another image provided with a broad diagnosis visible area is compared with an image recorded on a film in image quality, without performing the luminance correction processing, by emphasizing contrast (enlarging a dynamic range) to enhance a diagnosis performance, a low density portion changes to be white, a high density portion changes to be black, information disappears, an area able to be diagnosed is narrowed, and an image suitable for the object cannot be formed in some cases.

In this case, when the luminance correction processing is performed as described above, the dynamic range as the entire image is compressed to preserve density graduation. Additionally, since a fine structure on the image is kept by the luminance correction processing, as compared with a simple luminance correction processing, the image more suitable for the diagnosis purpose can be obtained by the subsequent image processing.

Moreover, the image processing apparatus of the present invention is preferably provided with an image processing condition operating section for adding, changing, and deleting the image processing condition in response to an operation.

By providing the image processing condition operating section, the image processing condition can be adjusted, for example, for each image processing apparatus, or for each user which uses the image processing apparatus even with one image processing apparatus, and the image provided with a satisfactory observation performance can be obtained in accordance with an environment in which the image processing apparatus is installed, user's liking, and the like.

Moreover, for the image processing apparatus of the present invention, the medical image subjected to the image processing may be transferred to another apparatus, but the image processing apparatus itself of the present invention is preferably provided with an image display section for displaying the medical image subjected to the image processing by the image processing section.

Here, the apparatus is preferably provided with an interested area designating section for designating a desired area of interest on the medical image displayed in the image display section in response to the operation, and the image display section lowers a luminance of an area excluding the area of interest designated by the interested area designating section to display the medical image.

Moreover, in this case, the interested area designating section preferably designates the desired area of interest on the medical image displayed in the image display section and designates a coefficient indicating a degree of drop of the luminance of the area excluding the area of interest in response to the operation, and the image display section lowers the luminance of the area excluding the area of interest designated by the interested area designating section down to the luminance in accordance with the coefficient designated by the interested area designating section to display the medical image.

When the area of interest is designated on the medical image, by lowering the luminance of the area except the area of interest on the medical image and displaying the medical image, there is provided a medical image easy to observe with respect to the area of interest. In this case, when the luminance of the area except the area of interest can arbitrarily be adjusted, a position of the area of interest in the entire medical image can be confirmed in accordance with the user's liking, and adjustment can be performed in such a manner that the area of interest can be observed in a concentrated manner.

Moreover, when the image processing apparatus of the present invention is provided with the interested area designating section, the apparatus is further provided with a part recognizing section for recognizing positions of a plurality of parts appearing in one medical image, and the image processing section preferably subjects the area of interest designated by the interested area designating section to the image processing for the part appearing on the area of interest among the parts recognized by the part recognizing section.

In this case, when an observer designates the area of interest, the observer does not have to designate the image processing condition in accordance with the area of interest, the image processing is performed on the image processing condition suitable for the designated area of interest, and operability is enhanced.

Moreover, when the image processing apparatus of the present invention is provided with the interested area designating section, the image display section arranges and displays a plurality of medical images, applies the same area of interest as the area of interest designated by the interested area designating section with respect to one medical image among the plurality of medical images displayed on the image display section to the plurality of medical images, and lowers the luminance of the area except the area of interest of each medical image to display the plurality of medical images.

By setting and displaying the same area of interest in the plurality of medical images in this manner, it becomes easy to compare and examine, for example, a past case with a current symptom with respect to the area of interest.

Furthermore, when the image processing apparatus of the present invention is provided with the image display section, the apparatus is provided with a scanning processing designating section for designating a scanning processing of setting the area of interest on the medical image displayed in the image display section and moving the area of interest in a predetermined direction in response to the operation, and the image display section preferably displays the medical image in which the area of interest successively moves, and the luminance of the area except the area of interest is lowered in response to designation of the scanning processing by the scanning processing designating section.

Moreover, in this case, the apparatus is provided with the part recognizing section for recognizing the positions of the plurality of parts appearing in one medical image, and the image processing section preferably subjects the successively moving area of interest to the image processing in accordance with the part appearing in the successively moving area of interest among the parts recognized by the part recognizing section.

In this case, the image processing condition does not have to be designated, and in response to the movement of the area of interest the moved area of interest is displayed in an easily observed mode.

Furthermore, when the image processing apparatus of the present invention is provided with the scanning processing designating section, for the image display section, in response to the designation of the scanning processing by the scanning processing designating section, the same area of interest is set in the same position at the same timing and the plurality of medical images in which the area of interest moves synchronously at the same speed are preferably arranged and displayed.

In this case, the symmetry of the human body can be observed, for example, in comparison with a past image.

Moreover, in the image processing apparatus of the present invention, the data obtaining section typically obtains a radiation image as one type of the medical image.

When the image processing apparatus of the present invention is specified as an apparatus for handling the radiation image, there is provided an image processing apparatus for subjecting the radiation image to an image processing, comprising:

an image processing condition storing section for storing an image processing condition when the radiation image is subjected to the image processing in accordance with a photography device type and photography part when the radiation image is obtained;

a data obtaining section for obtaining the radio image, and the photography device type and photography part when the radiation image is obtained; and an image processing section for reading the image processing condition for the same photography device type and photography part as the photography device type and photography part obtained by the data obtaining section from the image processing condition storing section, and subjecting the radiation image obtained by the data obtaining section to the image processing in accordance with the read image processing condition.

Moreover, in order to achieve the aforementioned object according to the present invention there is provided an image processing method for subjecting a medical image to an image processing, comprising steps of:

storing an image processing condition when the medical image is subjected to the image processing in accordance with a photography device type and a photography condition when the medical image is obtained; and obtaining the medical image, and the photography device type and the photography condition when the medical image is obtained, and subjecting the obtained medical image to the image processing in accordance with the image processing condition for the same photography device type and photography condition as the obtained photography device type and photography condition.

The image processing method of the present invention is a method realized by the image processing apparatus of the present invention, and includes modes corresponding to all modes of the image processing apparatus of the present invention.

Furthermore, in order to achieve the aforementioned object according to the present invention there is provided with an image processing program storage medium in which an image processing program for operating a computer system as an image processing apparatus for subjecting a medical image to an image processing is stored, the stored image processing program comprising:

a data obtaining section for obtaining the medical image, and a photography device type and a photography condition when the medical image is obtained; and an image processing section for subjecting the medical image obtained by the data obtaining section to the image processing in accordance with an image processing condition for the same photography device type and photography condition as the photography device type and photography condition obtained by the data obtaining section.

For the image processing program storage medium of the present invention, when the stored image processing program is executed by the computer system, the computer system is operated as the image processing apparatus of the present invention, and modes corresponding to all modes of the image processing apparatus of the present invention are included.

BRIEF DESCRIPTION OF THE DRAWINGS

FIGS. 6A and 6B are explanatory views of a principle of a luminance correction processing.

DETAILED DESCRIPTION OF THE PREFERRED EMBODIMENTS

An embodiment of the present invention will be described hereinafter.

Here, the embodiment constituted by mounting an image processing program on a personal computer and operated as an image processing apparatus of the present invention will be described. Therefore, first the personal computer itself will be described, and a processing content executed by the personal computer will next be described.

Figure 1:
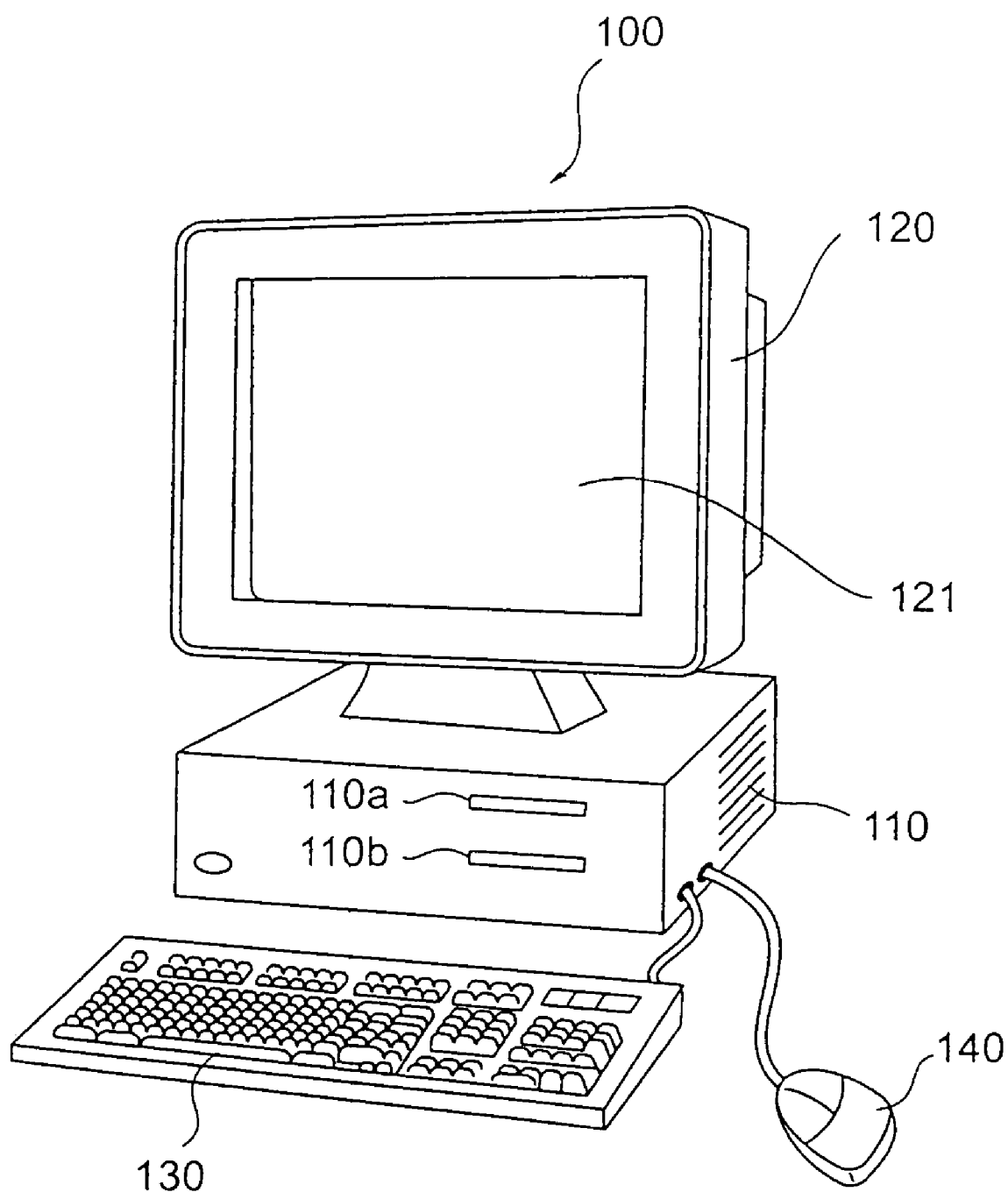
FIG. 1 is an appearance perspective view of a personal computer.
Figure 2:
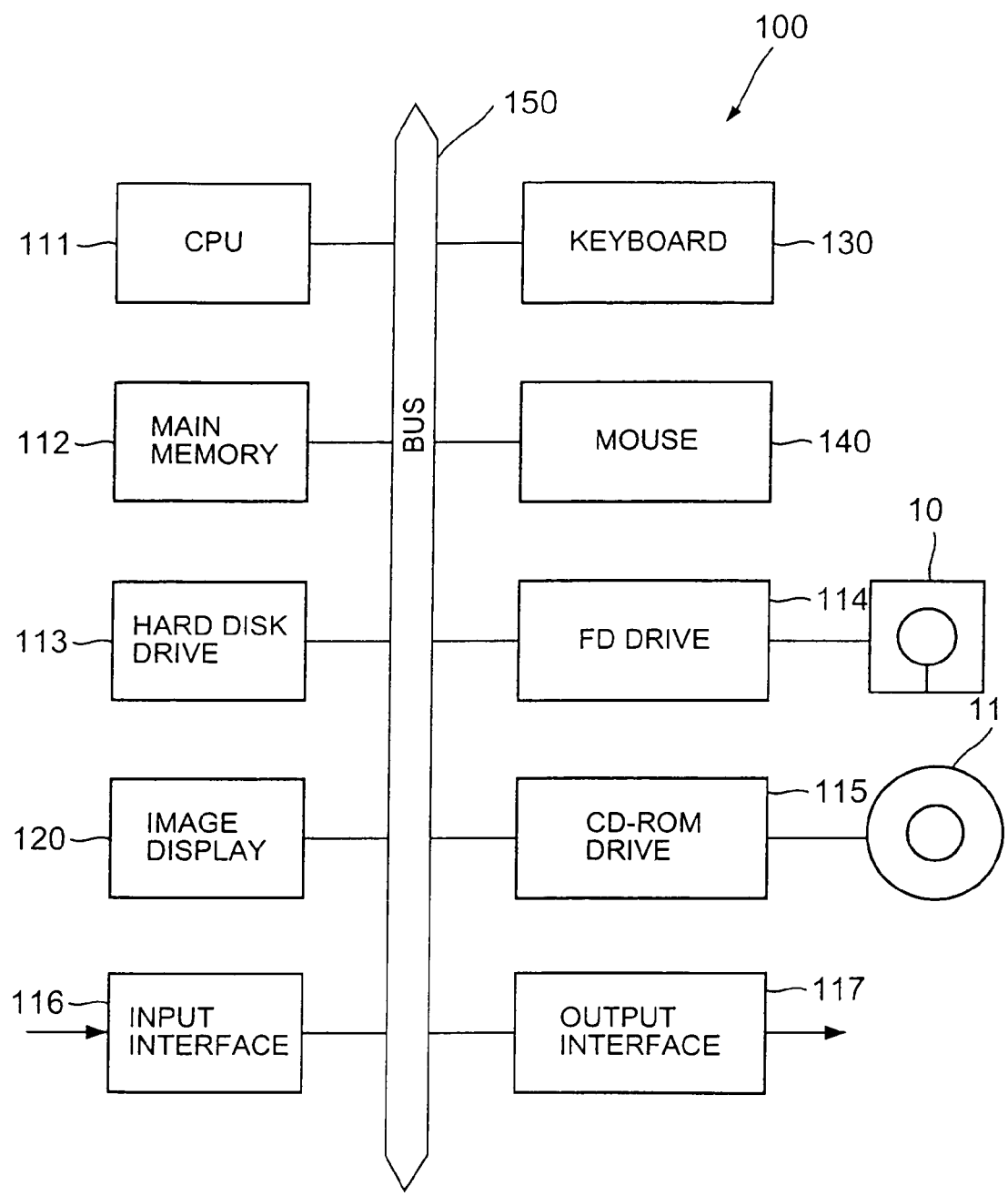
FIG. 2 is a hardware constitution view of the personal computer.

FIG. 1 is an appearance perspective view of the personal computer, and FIG. 2 is a hardware constitution view of the personal computer.

For an appearance constitution, a personal computer 100 is provided with: a main body apparatus 110; an image display 120 for displaying an image on a display screen 121 in response to an instruction from the main body apparatus 110: a keyboard 130 for inputting various information to the main body apparatus 110 in response to key operation; and a mouse 140 for designating an arbitrary position on the display screen 121 to input the instruction, for example, corresponding to an icon displayed in the position. In appearance, the main body apparatus 110 is provided with a floppy disk mounting port 110a for mounting a floppy disk, and a CD-ROM mounting port 110b for mounting a CD-ROM.

As shown in FIG. 2, the main body apparatus 110 contains therein: a CPU 111 for executing various programs; a main memory 112 for developing the program to be executed by the CPU 111; a hard disk drive 113 in which various programs and data are stored; an FD drive 114, on which a floppy disk 10 is mounted, for accessing the mounted floppy disk 10; a CD-ROM drive 115, on which a CD-ROM 11 is mounted, for accessing the mounted CD-ROM 11; an input interface 116, connected to a scanner for reading the medical image obtained on a medical image obtaining photography device or a film to obtain digital data represented by the medical image, for receiving the medical image as the digital data; and an output interface 117 for transmitting the medical image subjected to an image processing to the outside, and these various devices are connected to the image display 120, keyboard 130 and mouse 140 also shown in FIG. 1 via a bus 150.

Figure 3:
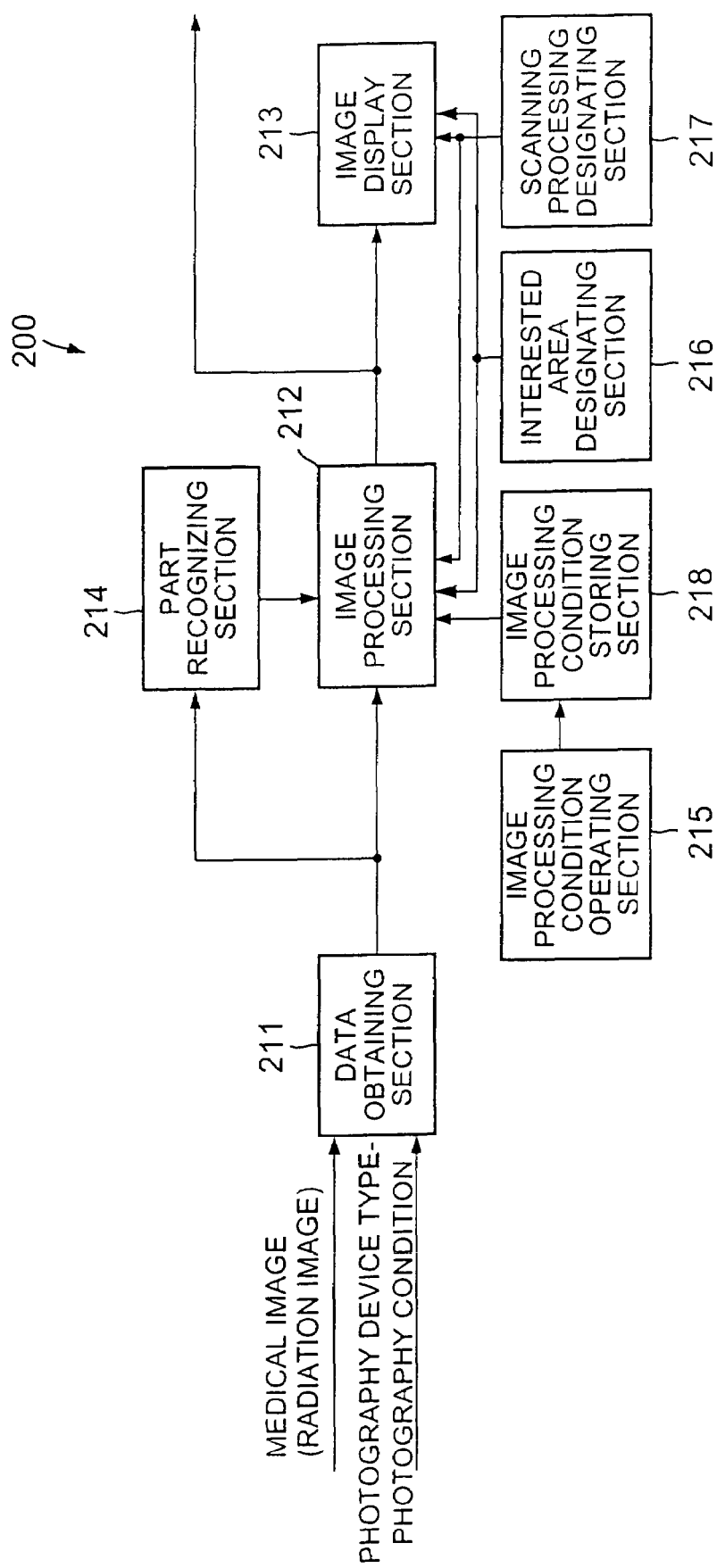
FIG. 3 is a function block diagram of a first embodiment of an image processing apparatus of the present invention.

FIG. 3 is a function block diagram of a first embodiment of the image processing apparatus of the present invention.

An image processing apparatus 200 shown in FIG. 3 is constituted of the personal computer shown in FIGS. 1 and 2, data stored in the personal computer and the program operated by the personal computer.

To a data obtaining section 211 of the image processing apparatus shown in FIG. 3, medical images such as a radiation image, and a photography device type and photography condition when the medical image is obtained, represented by digital data, are inputted, and the data obtaining section 211 generates an object constituted by combining the inputted medical image, photography device type and photography condition.

On hardware, the data obtaining section 211 is constituted of the input interface 116 shown in FIG. 2, the hard disk drive 113 and main memory 112 for storing the program to generate the object, the CPU 111 for executing the program, and the like. The medical image, photography device type and photography condition inputted to the data obtaining section 211 and combined and generated as the object are inputted to an image processing section 212, and the image processing section 212 subjects the medical image to the image processing.

In an image processing condition storing section 218, as partially illustrated in tables 1 to 3, the photography device type and photography condition and an image processing condition are correlated with one another and stored.

Moreover, in the image processing condition storing section 218, in response to the photography device types and photography conditions, and even with one photography device type and one photography condition, the image processing condition for respective parts (e.g., a lung-field, mediastinum, rib, heart, diaphragm, and the like) in a chest simple X-ray image) appearing in the medical image photographed by the photography device type and on the photography condition is also stored.

Furthermore, these image processing conditions can be customized for each user (e.g., each doctor or each inspecting engineer). When the customizing is performed, the image processing condition for each user is stored in the image processing condition storing section 218.

In order to subject the medical image in the object sent from the data obtaining section 211 to the image processing, the image processing condition for the same photography device type and photography condition as the photography device type and photography condition in the object is read, and the image processing section 212 performs the image processing in accordance with the image processing condition read from the image processing condition storing section 218. In connection to the hardware, the image processing section 212 corresponds to the hard disk drive 113 and main memory 112, shown in FIG. 2, for storing the image processing program, and the CPU 111 for executing the image processing program, and on the hardware, the image processing condition storing section 218 corresponds to the hard disk drive 113 for storing a table prepared by combining the photography condition with the image processing condition as illustrated in the tables 1 to 3.

Additionally, here, the medical image before subjected to the image processing in the image processing section 212 will be referred to as an input image, and the medical image after subjected to the image processing will be referred to as an output image.

TABLE 1

| Photography device type | Device ABC | Image processing condition (image quality parameter) | |
|---|---|---|---|
| Photography condition | | Luminance correction processing parameter | |
| Photography part | Chest | Mask size (horizontal and vertical) | 41 |
| Photography division | Simple photography | Load coefficient (weight) | 0.5 |
| Posture/direction Method | Front General | Gradation processing parameter | |
| | photography | Point A | 0.000 |
| | | Point B | 0.029 |
| | | Point C | 0.117 |
| | | Point D | 0.260 |
| | | Point E | 0.436 |
| | | Point F | 0.670 |
| | | Point G | 0.880 |
| | | Point H | 0.970 |
| | | Point I | 1.000 |
| | | Frequency parameter | |
| | | Mask size (horizontal and vertical) | 21 |
| | | First load coefficient W1 | 0.4 |
| | | Second load coefficient W2 | −0.4 |
| | | Frequency emphasis type | Z |
| | | Lower limit value | 0.000 |
| | | Upper limit value | 1.000 |

TABLE 2

| Photography device type | Device ABC | Image processing condition (image quality parameter) | |
|---|---|---|---|
| Photography condition | | Luminance correction processing parameter | |
| Photography part | Chest | Mask size (horizontal and vertical) | 41 |
| Photography division | Simple photography | Load coefficient (weight) | 0.6 |
| Posture/direction Method | Side General | Gradation processing parameter | |
| | photography | Point A | 0.000 |
| | | Point B | 0.029 |
| | | Point C | 0.117 |
| | | Point D | 0.260 |
| | | Point E | 0.436 |
| | | Point F | 0.680 |
| | | Point G | 0.835 |
| | | Point H | 0.930 |
| | | Point I | 1.000 |
| | | Frequency parameter | |
| | | Mask size (horizontal and vertical) | 21 |
| | | First load coefficient W1 | 0.3 |
| | | Second load coefficient W2 | −0.3 |
| | | Frequency emphasis type | Z |
| | | Lower limit value | 0.000 |
| | | Upper limit value | 1.000 |

TABLE 3

| Photography device type | Device ABC | Image processing condition (image quality parameter) | |
|---|---|---|---|
| Photography condition | | Luminance correction processing parameter | |
| Photography part | Neck | Mask size (horizontal and vertical) | 31 |

TABLE 3-continued

| Photography division | Simple photography | Load coefficient (weight) | 0.3 |
|---|---|---|---|
| Posture/direction Method | Side General | Gradation processing parameter | |
| | photography | Point A | 0.000 |
| | | Point B | 0.110 |
| | | Point C | 0.280 |
| | | Point D | 0.520 |
| | | Point E | 0.740 |
| | | Point F | 0.850 |
| | | Point G | 0.912 |
| | | Point H | 0.960 |
| | | Point I | 1.000 |
| | | Frequency parameter | |
| | | Mask size (horizontal and vertical) | 15 |
| | | First load coefficient W1 | 0.5 |
| | | Second load coefficient W2 | −0.5 |
| | | Frequency emphasis type | F |
| | | Lower limit value | 0.000 |
| | | Upper limit value | 1.000 |

The medical image subjected to the image processing in the image processing section 212 (output image) is inputted to an image display section 213, or transmitted to the outside via the output interface 117 shown in FIG. 2. On the hardware, the image display section 213 corresponds to the image display 120 shown in FIGS. 1 and 2.

The medical image displayed in the image display section 213, or the medical image transmitted to the outside and displayed in the outside is used for diagnosis. The displayed medical image is a medical image subjected to the image processing by the image processing condition in accordance with the photography device type and photography condition, and is a preferable image for diagnosis irrespective of a medical image type.

Moreover, in response to the operation, an image processing condition operating section 215 changes or deletes the image processing condition stored in the image processing condition storing section 218, or adds a new image processing condition to the image processing condition storing section 218.

Furthermore, an interested area designating section 216 designates a desired area of interest on the medical image displayed in the image display section 213 in response to the operation. When the interested area designating section 216 designates the area of interest, the image display section 213 lowers a luminance of an area except the area of interest designated by the interested area designating section and displays the medical image. In this case, the interested area designating section 216 also designates a coefficient indicating a degree of a drop of the luminance of the area except the designated area of interest in response to the operation, and the image display section 213 lowers the luminance of the area except the area of interest designated by the interested area designating section 216 down to the luminance in accordance with the coefficient designated by the interested area designating section 216 and displays the medical image.

Additionally, the image processing apparatus 200 shown in FIG. 3 is also provided with a part recognizing section 214, and the image processing section 212 is provided with a function of performing the image processing on the image processing condition for the part appearing in the designated area of interest when the area of interest is designated by the interested area designating section 216.

Here, the part recognizing section 214 automatically recognizes positions of a plurality of parts (e.g., lung field, rib, hear, and the like) appearing in one medical image (e.g., chest X-ray image).

Furthermore, the image display section 213 is provided with a function of arranging and displaying the plurality of medical images. In this case, the image display section 213 applies the same area of interest as the area of interest designated by the interested area designating section 216 with respect to one medical image among the plurality of medical images displayed in the image display section 213 to the plurality of medical images, and lowering the luminance of the area except the area of interest of each medical image to display the plurality of medical images.

Additionally, the image processing apparatus shown in FIG. 3 is also provided with a scanning processing designating section 217. The scanning processing designating section 217 designates a scanning processing of setting the area of interest (typically a slit-shaped area of interest extending in a transverse or vertical direction) on the medical image displayed in the image display section 213 to move the area of interest in a predetermined direction (e.g., the vertical direction for a slit extending in the transverse direction) in response to the operation.

When the scanning processing designating section 217 designates the scanning processing, the image display section 213 displays the medical image constituted by successively moving the area of interest set by the scanning processing designating section 217 and lowering the luminance of the area except the area of interest. In this case, depending on a mode of designation by the scanning processing designating section 217, the image processing section 212 subjects the successively moving area of interest to the image processing in accordance with the part appearing in the successively moving area of interest among the parts recognized by the part recognizing section 214.

The image display section 213 sets the same area of interest in the same position at the same timing in response to the designation of the scanning processing by the scanning processing designating section 217, and can arrange and display the plurality of medical images whose areas of interest move synchronously with one another at the same speed.

Figure 4:
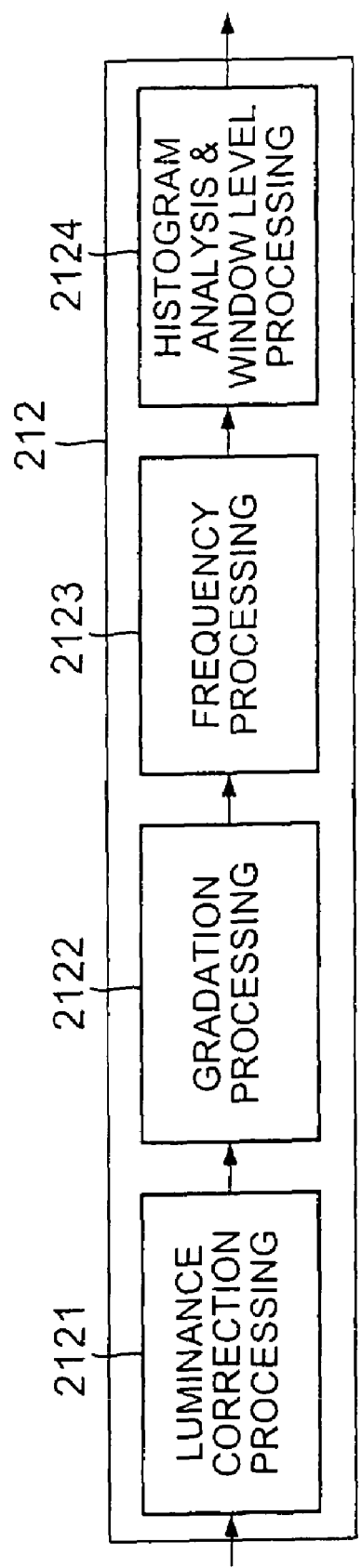
FIG. 4 is a detailed block diagram of an image processing section of the image processing apparatus shown in FIG. 3.

FIG. 4 is a detailed block diagram of the image processing section 212 in the image processing apparatus shown in FIG. 3.

In the image processing section 212, a luminance correction processing 2121, a gradation processing 2122, a frequency processing 2123, and a histogram analysis and window level processing 2124 are executed. Details of these processings will be described later.

Additionally, when the image processing is performed with respect to the area of interest designated by the interested area designating section 216 or the area of interest of the scanning processing designated by the scanning processing designating section 217, the histogram analysis and window level processing 2124 fails to be executed.

These are measures taken to display the area of interest entirely in a low luminance state when the luminance of the entire area of interest is low, and to display the area of interest entirely in a high luminance state when the luminance of the entire area of interest is high.

Figure 5:
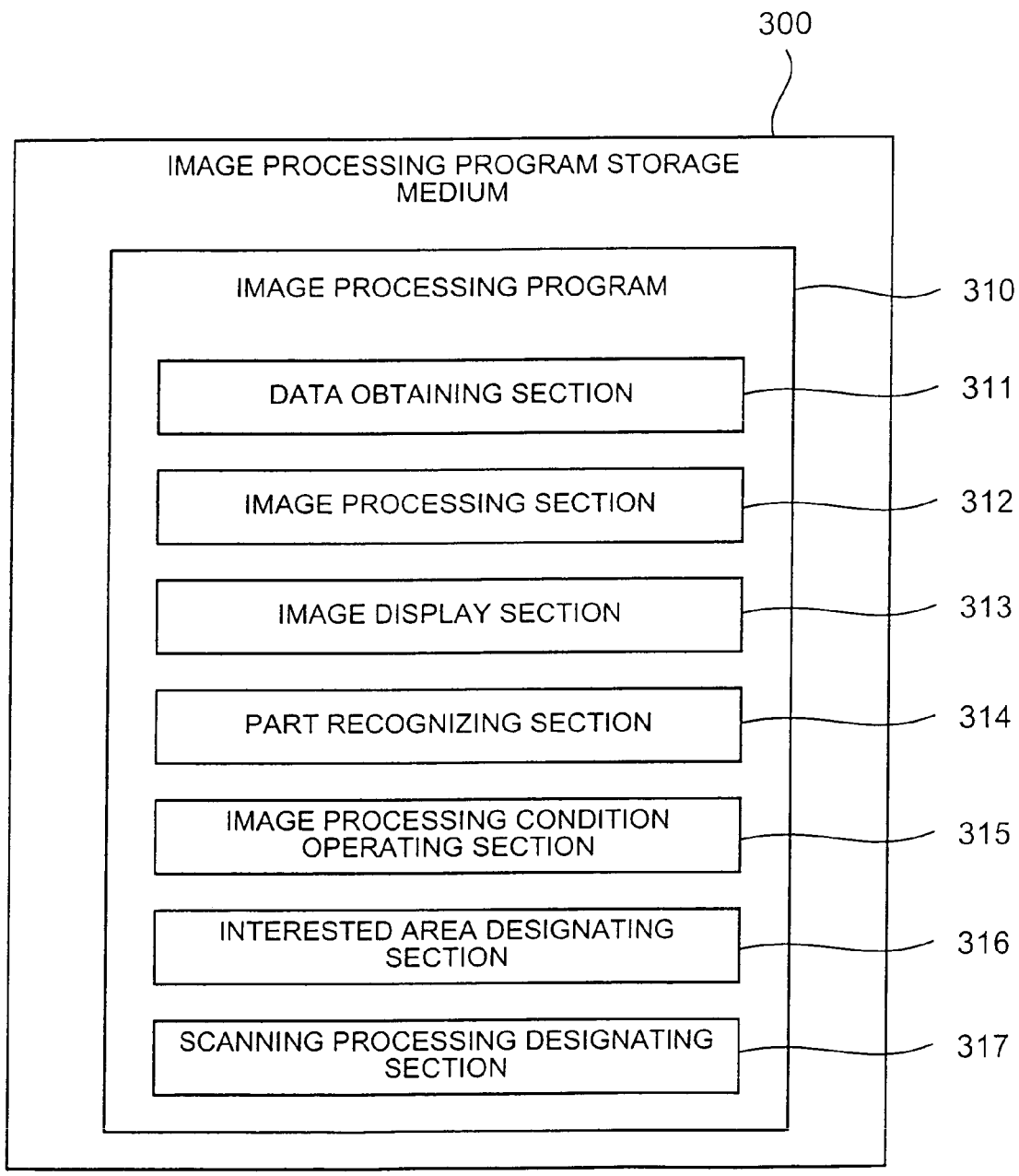
FIG. 5 is a schematic view showing one embodiment of a storage medium of the present invention.

FIG. 5 is a diagram showing one embodiment of an image processing program storage medium of the present invention.

For an image processing program storage medium 300 shown in FIG. 5, for example, the hard disk drive 113, CD-ROM 11 and floppy disk 10 shown in FIG. 2 in a state in which an image processing program 310 is stored are representatively shown, and in the image processing program storage medium 300, the image processing program 310 constituted of a data obtaining section 311, an image processing section 312, an image display section 313, a part recognizing section 314, an image processing condition operating section 315, an interested area designating section 316, and a scanning processing designating section 317 is stored.

The image processing program storage medium 300 is, for example, the CD-ROM 11 shown in FIG. 2 and placed in the state in which the image processing program 310 is stored, and in this case, the CD-ROM corresponds to one embodiment of the image processing program storage medium of the present invention. When the image processing program 310 stored in the CD-ROM 11 is read by the CD-ROM drive 115, installed in the hard disk drive 113, and further executed by the CPU 111, the personal computer 100 shown in FIGS. 1, 2 operates as one embodiment of the image processing apparatus of the present invention. The hard disk drive 113 in which the image processing program 310 is installed also corresponds to one embodiment of the image processing program storage medium of the present invention. When the image processing program 310 installed in the hard disk drive 113 is downloaded to the floppy disk 10 by the FD drive 114, the floppy disk in which the image processing program is stored also corresponds to one embodiment of the image processing program storage medium of the present invention.

Here, the data obtaining section 311, image processing section 312, image display section 313, part recognizing section 314, image processing condition operating section 315, interested area designating section 316, and scanning processing designating section 317 constituting the image processing program 310 shown in FIG. 5 correspond to the data obtaining section 211, image processing section 212, image display section 213, part recognizing section 214, image processing condition operating section 215, interested area designating section 216, and scanning processing designating section 217 constituting the image processing apparatus 200 shown in FIG. 3, respectively. Additionally, the respective devices of the image processing apparatus 200 of FIG. 3 refer to a combination of the hardware of the personal computer 100 shown in FIGS. 1, 2 with software executed in the hardware. For the respective devices constituting the image processing program 310 shown in FIG. 5, even when the same names are used, only an application program portion is referred to among the hardware and software.

FIG. 6 is an explanatory view of a principle of the luminance correction processing, FIG. 6A shows a state before the luminance correction processing, and FIG. 6B shows a state after the luminance correction processing. The abscissa of FIGS. 6A, 6B indicates a place of an image divided by an image density (lung field, mediastinum, diaphragm, and the like for the chest image), and the ordinate indicates a gradation value of the image. As seen from FIG. 6, with respect to a portion with a small gradation change, the image state before the processing (image gradation change state) is kept, and by narrowing a dynamic range only with respect to a portion with a large gradation change, an image can be obtained in which contrast fails to be visually lowered.

A basic algorithm of the luminance correction processing for use herein is newly realized for medical image diagnosis by referring to a convolution algorithm internationally standardized by Part 2 Programmer's imaging kernel system application program interface of ISO/IEC 12087-2 Image Processing and Interchange (IPI).

Figure 7:
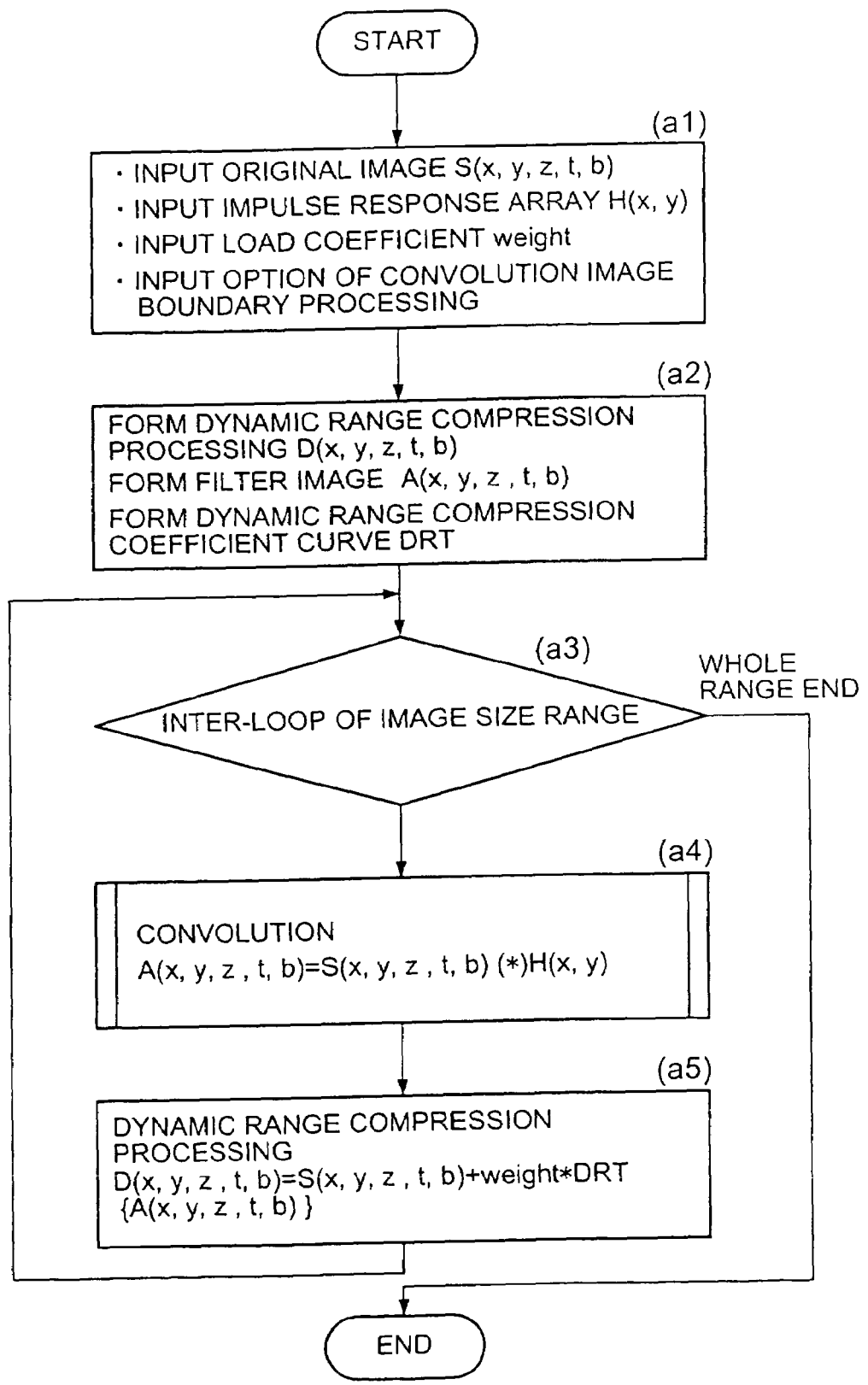
FIG. 7 is a flowchart of a luminance correction processing program.

FIG. 7 is a flowchart of a luminance correction processing program for executing the luminance correction processing 2121 in the image processing section 212 shown in FIG. 4.

First in a step a1, the followings are inputted into the program:

original image: S (x, y, z, t, b);

impulse response array H(x, y); and load coefficient weight

Among these, the impulse response array H(x, y) and the load coefficient weight are image processing conditions for the original image S(x, y, z, t, b).

Here, the original image S(x, y, z, t, b) denotes an image before the processing is executed (here, an image before a convolution processing is executed), and x, y, z, t, b of the original image S(x, y, z, t, b) denote a horizontal direction position, vertical direction position, depth, time, and band, respectively. Additionally, z (depth) denotes a case in which three-dimensional information obtained by MRI or the like is handled, t (time) denotes a case in which time information (dynamic image) of ultrasonic wave, endoscope or the like is handled, and b (band) denotes distinction of R, G, B, for example, when an image of three colors R, G, B is handled.

Moreover, the impulse response array H(x, y) denotes a mask provided with a uniform value here, and this array size (mask size) determines a frequency to be emphasized most among frequency components of the image. Specifically, when a large size mask is used, the image of low frequency components is emphasized. Conversely, when a small size mask is used, the image of high frequency components is emphasized.

By changing an unclear mask size in this manner, a frequency band important for diagnosis is emphasized, and a diagnosis image suitable for diagnosis purpose can be formed.

For the chest image, the array size (mask size) applied in the luminance correction processing was set to a mask size by which a low frequency component image following changes of rough structures such as the lung field and mediastinum film is emphasized.

The load coefficient weight is a constant indicating a degree of luminance correction.

Moreover, in step a1 of FIG. 7, it is inputted by an operation of an operator whether or not to perform an image boundary processing in convolution performed in step a4. Also for the image boundary processing, instead of an operator's inputting for each time, the processing is stored beforehand one of the image processing conditions for the photography condition, and presence/absence of the image boundary processing as one of the image processing conditions may be inputted to the luminance correction processing program.

In step a2, a luminance correction image D(x, y, z, t, b), filter image A(x, y, z, t, b), and luminance correction coefficient curve DRT are generated. In this step a2, with respect to the luminance correction image D(x, y, z, t, b), and the filter image A(x, y, z, t, b), only the array (area) is secured.

Figure 8:
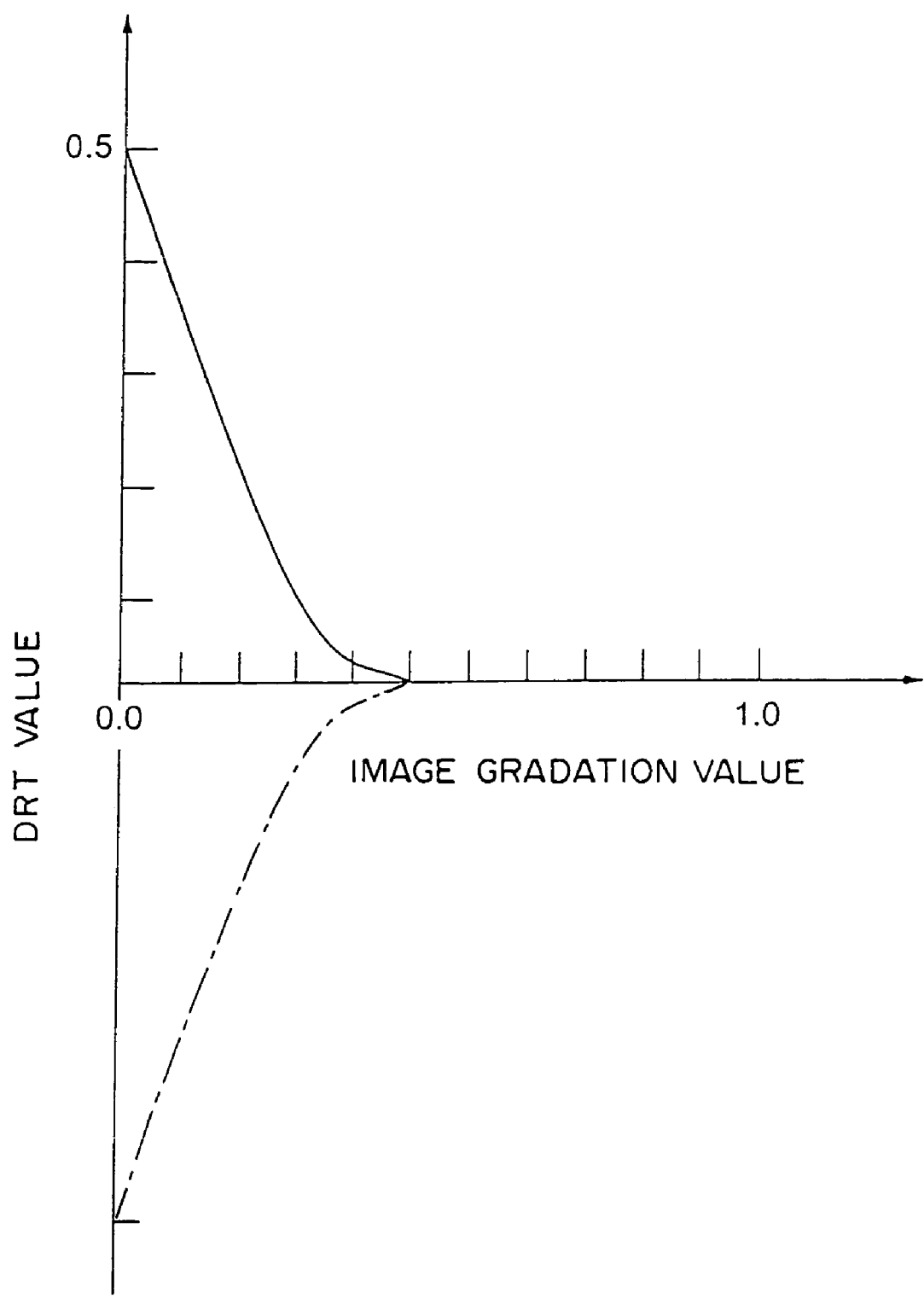
FIG. 8 is a graph showing a luminance correction processing curve.

Table 4 is a table showing a luminance correction coefficient table, and FIG. 8 is a chart showing a luminance correction curve.

TABLE 4

| Image gradation value point | DRT value |
| --- | --- |
| 0.000*image maximum pixel value | 0.500*image maximum pixel value |
| 0.304*image maximum pixel value | 0.091*image maximum pixel value |
| 0.322*image maximum pixel value | 0.070*image maximum pixel value |
| 0.339*image maximum pixel value | 0.053*image maximum pixel value |
| 0.356*image maximum pixel value | 0.038*image maximum pixel value |
| 0.374*image maximum pixel value | 0.024*image maximum pixel value |
| 0.391*image maximum pixel value | 0.015*image maximum pixel value |
| 0.409*image maximum pixel value | 0.008*image maximum pixel value |
| 0.500*image maximum pixel value | 0.000*image maximum pixel value |
| 1.000*image maximum pixel value | 0.000*image maximum pixel value |

The luminance correction coefficient table shown in Table 4 is stored beforehand, and in step a2 of FIG. 7 by linearly interpolating between respective values of the luminance correction coefficient table, a luminance correction coefficient curve DRT is generated as shown by a solid line of FIG. 8. The abscissa of the luminance correction coefficient curve shown in FIG. 8 indicates an image gradation value (normalized density of each point), and the ordinate indicates an DRT value indicative of a degree of luminance correction. Additionally, a dashed line shown in FIG. 8 shows another luminance correction coefficient curve.

It is judged in step a3 of FIG. 7 whether or not the processing of the next steps a4, a5 ends with respect to the whole area of the image. When the processing has not ended yet with respect to the whole area, the next one pixel is subjected to the processing of the steps a4, a5. When the processing of the steps a4, a5 has ended with respect to the whole area of the image, this luminance correction processing ends.

In the step a4, the convolution processing is performed with respect to one pixel noted at present.

In step a4, $$A(x,y,z,t,b)=S(x,y,z,t,b)(*)H(x,y) \quad (1)$$

indicates a processing of setting an average value of pixel values in an area of H(x, y) centering on one pixel noted at present anew as the pixel value of one noted pixel, and the filter image A(x, y, z, t, b) becomes a blurred image with a reduced high frequency component by the aforementioned calculation.

In the step a5, the luminance correction processing is performed with respect to one pixel noted at present. In step a5, for $$D(x,y,z,t,b)=S(x,y,z,t,b)+weight*DRT\{A(x,y,z,t,b)\} \quad (2),$$

DRT{A(x, y, z, t, b)} indicates a DRT value (see FIG. 8) for the pixel value of the filter image A(x, y, z, t, b) of the presently noted pixel, and the equation (2) means that the DRT value weighted by the coefficient weight is added to the pixel value of the same pixel of the original image S(x, y, z, t, b). By employing the DRT curve shown by a solid line in FIG. 8 in this manner, the luminance correction processing shown in FIG. 6 is realized. In the luminance correction processing shown in FIG. 6, the luminance of a high luminance (whitish) portion is lowered, but by employing the DRT curve shown by the dashed line of FIG. 8, the luminance of a low luminance (blackish) portion is raised.

Figure 9:
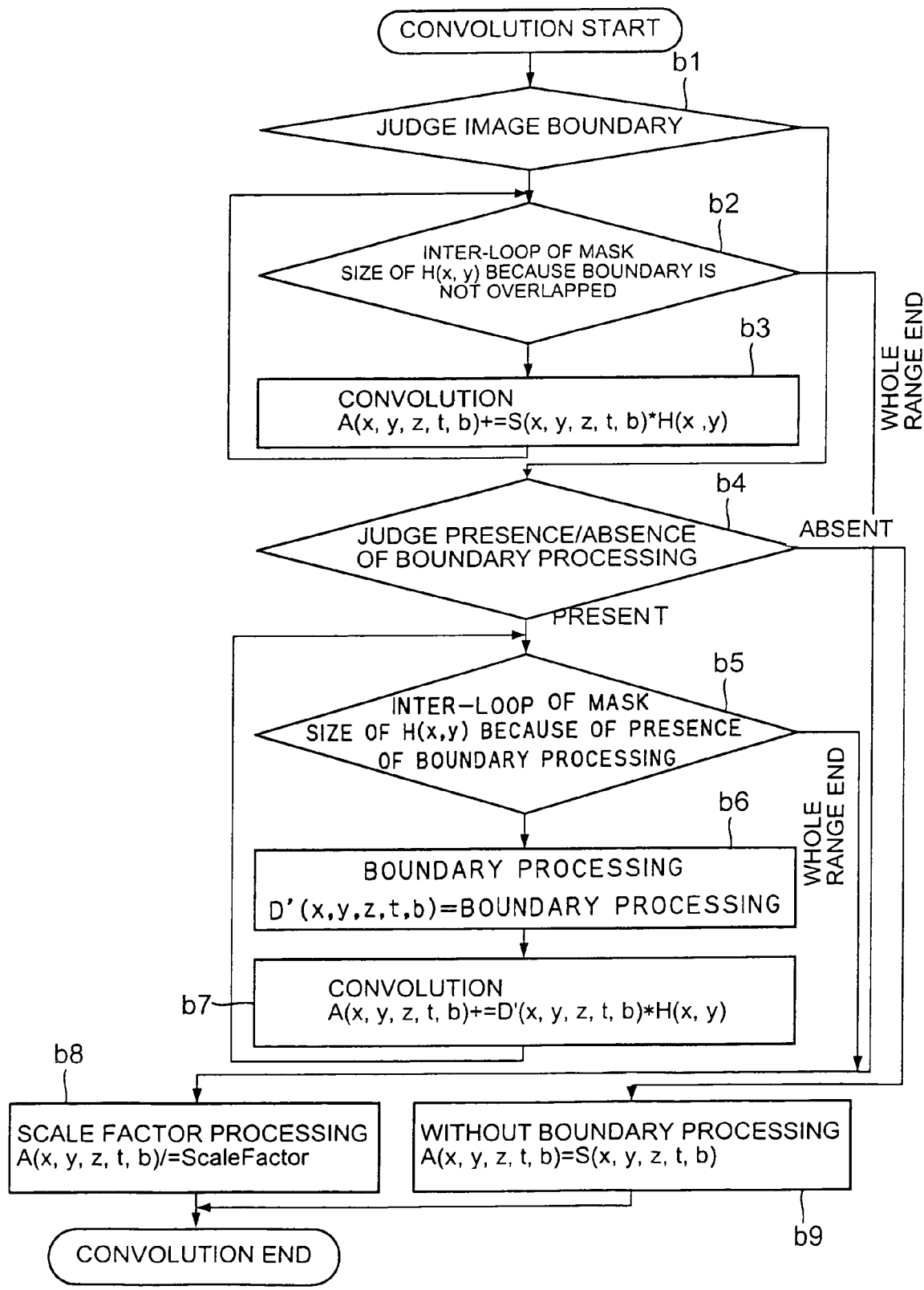
FIG. 9 is a flowchart showing a convolution processing routine.

FIG. 9 is a flowchart showing a convolution processing routine in the step a4 of FIG. 7.

In step b1, an image boundary determination is performed. Specifically, when the mask H(x, y) is superposed on the original image centering on the presently noted one pixel, it is judged whether or not a portion of the mask H(x, y) is out of an original image end.

When the mask fails to overlap (fails to stick out of) a boundary, the processing advances to step b2 to judge whether or not the processing of step b3 is performed with respect to the whole area of the mask H(x, y), in step b3 the original image S(x, y, z, t, b) is multiplied by the mask H(x, y) for each pixel with respect to the whole area of the mask H(x, y) and a multiplication result is accumulated as the value of one presently noted pixel of the filter pixel A(x, y, z, t, b).

When accumulation ends with respect to the whole area of the mask H(x, y), the processing advances to step b8 to perform a scale factor processing of returning the accumulated value obtained by accumulation back to the average value with one pixel, and the convolution routine is exited.

In the step b1, it is determined that the mask H(x, y) sticks out of the boundary of the original image S(x, y, z, t, b) with respect to the presently noted one pixel, then the processing advances to step b4, and it is judged in the step b4 whether or not performing of a boundary processing is designated. When no boundary processing is performed, the processing advances to step b9, the pixel value of the original image is employed as it is as the pixel value of the filter image with respect to the presently noted one pixel, and the convolution processing routine is exited.

When it is determined in the step b4 that the boundary processing is performed, the processing advances to step b5 to judge whether or not the next two steps b6, b7 end with respect to the whole area of the mask H(x, y).

In the step b6 the boundary processing is performed, and in the step b7 accumulation is performed similarly as the step b3 with respect to the image subjected to the boundary processing.

A boundary processing method employed in the step b6 is realized by referring to a reflected exterior mode algorithm of convolve_2d internationally standardized by Part 2 Programmer's imaging kernel system application program interface of ISO/IEC 12087-2 Image Processing and Interchange (IPI). The boundary processing is a processing of turning back the pixel value in the so-called original image boundary in such a manner that linear symmetry is obtained, and increasing the pixel to the outside of the boundary of the original image.

When the accumulated value is obtained with the presently noted one pixel in the step b5, the processing advances to step b8, and the average value is obtained in the step b8.

The blurred filter image A(x, y, z, t, b) is generated as the image as described above.

Additionally, it is determined whether or not to perform the boundary processing on the basis of whether or not the image including meaningful information spreads to a peripheral edge area of the original image. When the meaningful information spreads to the peripheral edge area, even with much time required for the image processing, it is preferable to perform the boundary processing. When there is little meaningful information in the peripheral edge area, it is preferable to omit the boundary processing and shorten the time required for the image processing.

Figure 10:
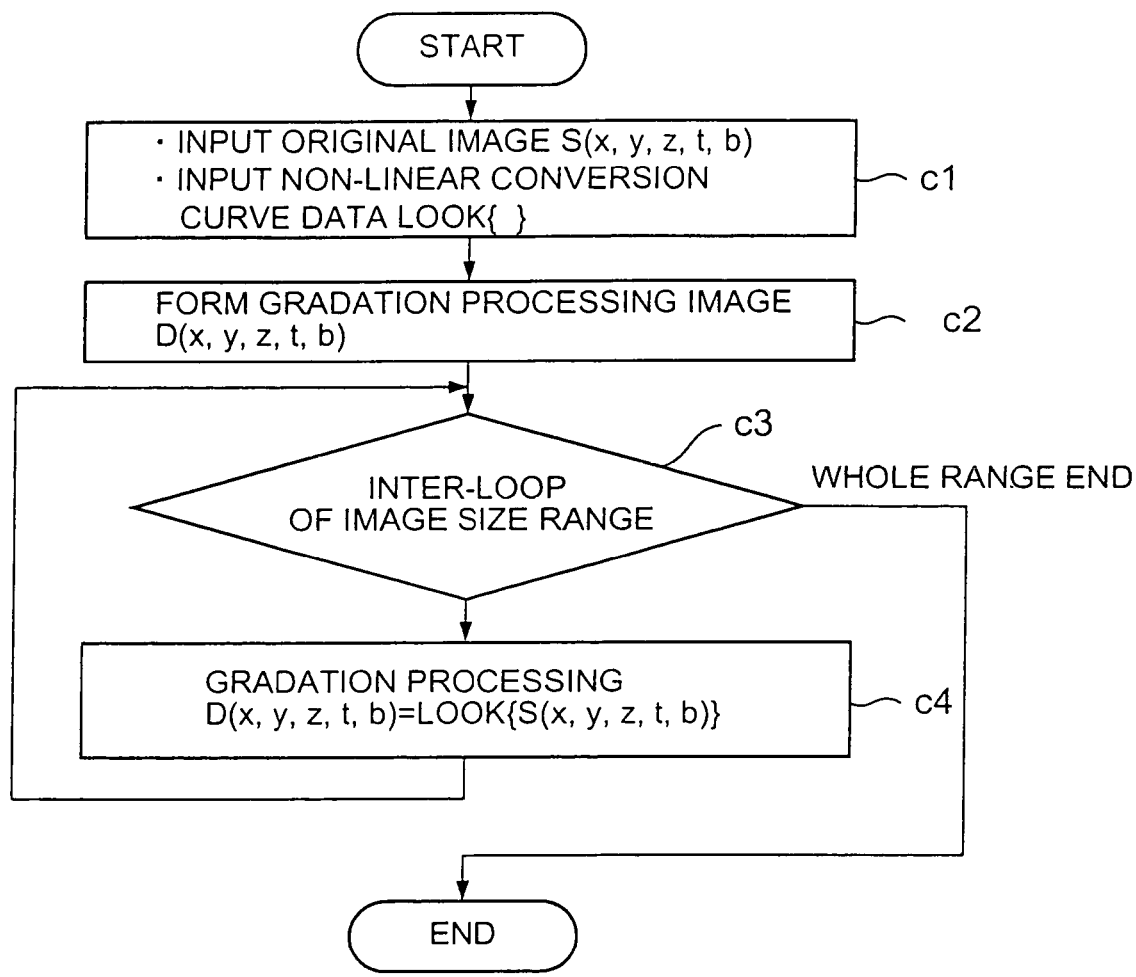
FIG. 10 is a flowchart of a gradation processing program.

FIG. 10 is a flowchart of a gradation processing program for executing the gradation processing 2122 in the image processing section 212 shown in FIG. 4.

In step c1, the original image (image before the gradation processing) S(x, y, z, t, b), and non-linear conversion curve data LOOK{ } are inputted. The non-linear conversion curve data LOOK{ } is a lookup table prepared as described later based on a gradation processing parameter (points A to I) of the image processing condition (refer to Tables 1 to 3).

In step c2, a gradation processing image D(x, y, z, t, b) is formed. Additionally, this means that the area for the gradation processing image is secured, and respective pixel values of the gradation processing image are prepared in step c4.

It is judged in step c3 whether or not the processing of the step c4 ends over the whole range of the image, and when the processing has not ended yet, the processing of the step c4 is performed for each pixel.

In the step c4, the non-linear conversion curve data LOOK{ } of the lookup table form is referred to and conversion of each pixel value is performed.

Figure 11:
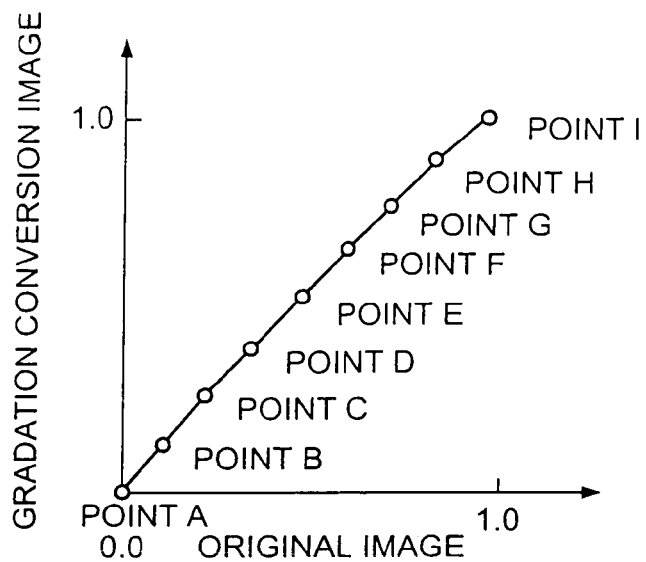
FIG. 11 is a graph showing a correspondence between a pixel value of an original image and the pixel value of a gradation conversion image.

FIG. 11 is a graph showing a correspondence between the pixel value of the original image and the pixel value of a gradation conversion image.

with respect to the original image (abscissa), from 0.0 (minimum density) to 1.0 (maximum density), nine points (points A to I) are taken at equal intervals, and for the gradation conversion image (ordinate), the gradation processing parameter (points A to I) of the image processing condition is applied to each point. When these nine points are smoothly connected by a spline curve, the non-linear conversion curve data LOOK{ } is formed. The spline curve is realized by referring to the algorithm of a scroll periodic spline curve of "Scientific Technical calculated by revised C published by CQ Company and authored by Shinichi Koike."

Figure 12:
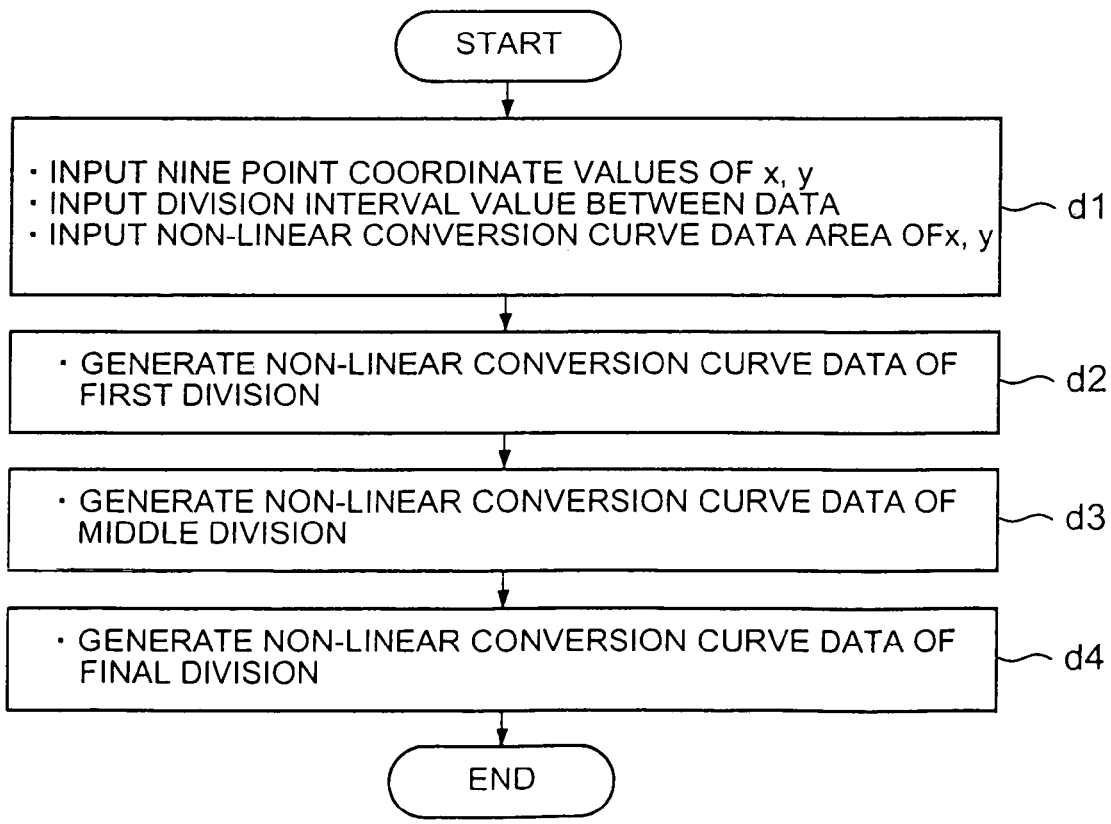
FIG. 12 is a flowchart showing a non-linear conversion curve data preparation processing.

FIG. 12 is a flowchart showing a non-linear conversion curve data preparation processing.

First in step d1, coordinate values of nine points (points A to I) of x-axis (original image) and y-axis (gradation conversion image), and a division interval value between data are inputted, and the storage area LOOK{ } of the non-linear conversion curve data is secured.

In order to prepare the spline curve, since different processings are necessary in both ends and middle, in step d2 the non-linear conversion curve data of a first division (between the points A and B) is generated, in step d3 the non-linear conversion curve data of a middle division (between the points B and H) is generated, and in step d4 the non-linear conversion curve data of the last division (between the points H and I) is generated.

In step c1 of FIG. 10, the non-linear conversion curve data LOOK{ } prepared beforehand in this manner is inputted, or in the step c1 the non-linear conversion curve data LOOK{ } is prepared.

The frequency processing 2123 in the image processing section 212 shown in FIG. 4 will next be described.

Figure 13:
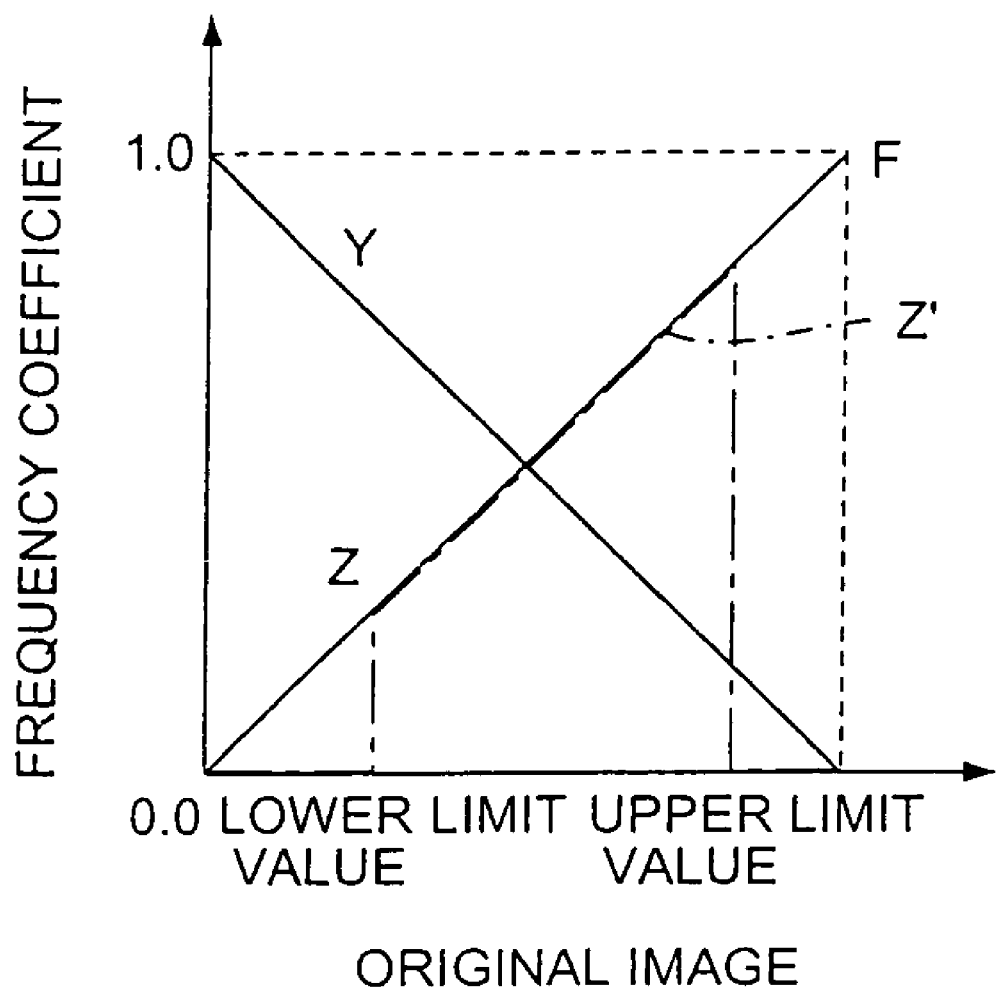
FIG. 13 is a chart showing a frequency coefficient showing a degree of frequency emphasis with respect to the pixel value of the original image.

FIG. 13 is a chart showing a frequency coefficient showing a degree of frequency emphasis with respect to the gradation value of the original image.

A frequency emphasis type F means that a frequency coefficient is always 1.0 irrespective of the gradation value of the original image, a frequency emphasis type Z means that with a larger gradation value of the original image (with a higher image density (with a lower luminance)), the frequency emphasis is performed more strongly, and a frequency emphasis type Y means that with a smaller gradation value of the original image (with a lower image density (with a higher luminance)), the frequency emphasis is performed more strongly. As shown in Tables 1 to 3, the frequency emphasis type is designated as one of the image processing conditions.

Additionally, lower and upper limit values of an original image density area (luminance area) for performing frequency emphasis can be set as shown by a dashed line Z' of FIG. 13, and the frequency emphasis is performed only in the area held between the lower limit value and the upper limit value.

Figure 14:
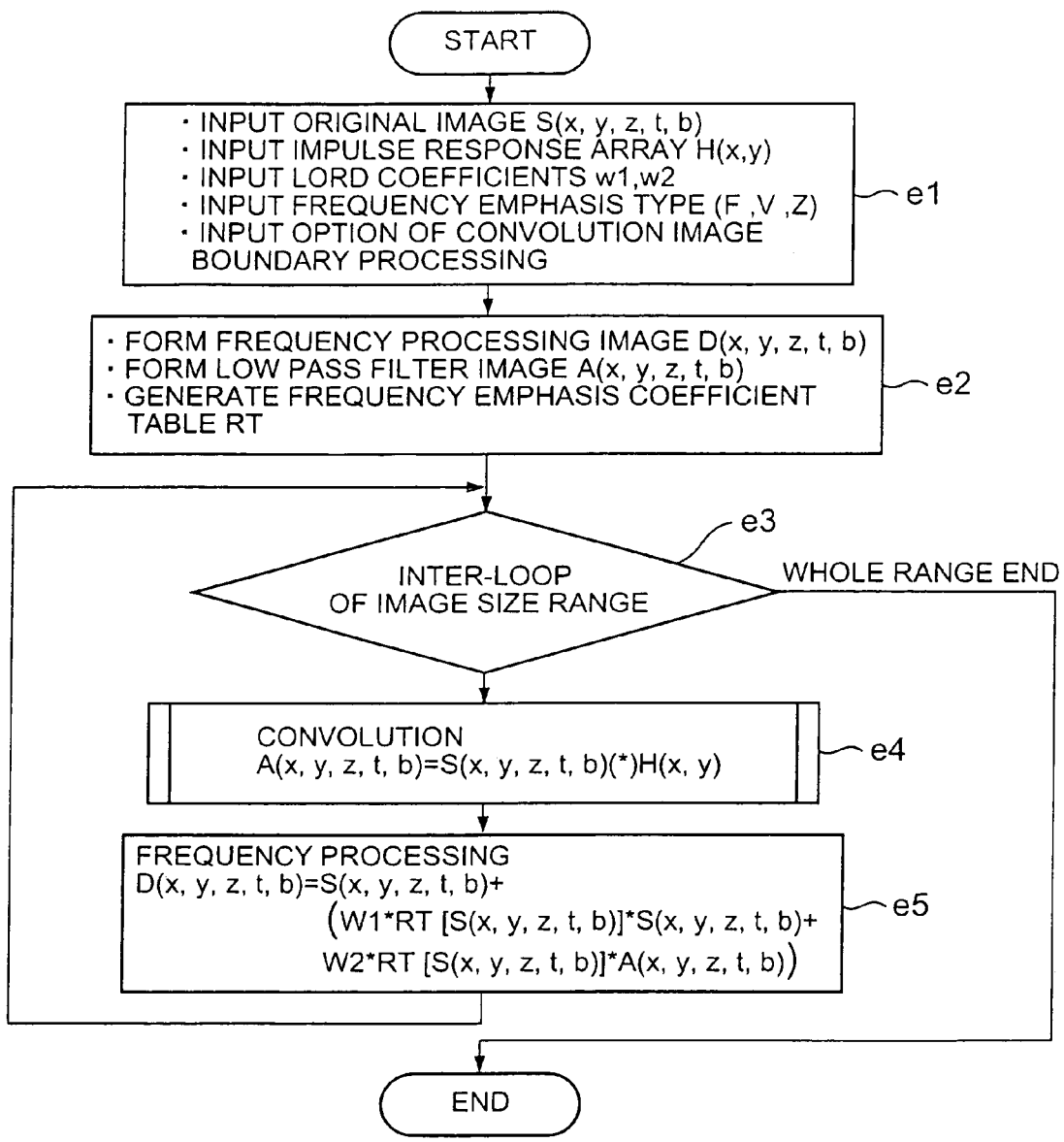
FIG. 14 is a flowchart of a frequency processing program.

FIG. 14 is a flowchart of a frequency processing program.

First in step e1, original image (image before a frequency processing) S(x, y, z, t, b), impulse response array (uniform mask herein) H(x, y), load coefficients W1, W2, frequency emphasis type (any one of F, V, Z), and an instruction as to whether or not to perform a convolution image boundary processing are inputted. Among these, the impulse response array H(x, y) is designated as a mask size in the image processing condition, and the load coefficients W1, W2 and frequency emphasis type are also designated as the image processing conditions.

The convolution image boundary processing is optional here, and is constituted in such a manner that an operator gives an instruction for each image processing, but designation of whether or not to perform the image boundary processing may be designated beforehand as one of the image processing conditions.

In step e2, the image subjected to the frequency processing (frequency processing image) D(x, y, z, t, b), low pass filter image A(x, y, z, t, b), and frequency emphasis coefficient table RT are generated. With respect to the frequency processing image D(x, y, z, t, b) and low pass to filter image A(x, y, z, t, b), it is meant that in the step e2 an area for storing the images are secured, and actual data is prepared in steps e4, e5. The frequency emphasis coefficient table RT is formed by obtaining the coefficients for respective gradation values with respect to the frequency emphasis type (e.g., frequency emphasis type Z for Table 1) designated in accordance with the image processing condition among some frequency emphasis types F, Y, Z shown in FIG. 13 and arranging data in a table form.

It is judged in step e3 whether or not the processing of steps e4, e5 to be performed for each pixel ends with respect to the whole range of the image, and the processing of the steps e4, e5 is performed for each pixel with respect to the respective pixels in the whole range.

The step e4 corresponds to convolution, and has already been described with reference to FIG. 9, and redundant description is omitted here. As a result of convolution, so-called blurred image A(x, y, z, t, b) with a reduced high frequency component is formed.

In step e5, the frequency processing is performed in accordance with:

$$D(x,y,z,t,b)=S(x,y,z,t,b)$$
$$+(W1*RT[S(x,y,z,t,b)]*S(x,y,z,t,b)$$
$$+W2*RT[S(x,y,z,t,b)]*A(x,y,z,t,b) \quad (3)$$

In this equation (3) RT[S(x, y, z, t, b)] is a frequency coefficient (ordinate of FIG. 13) corresponding to the pixel value (abscissa of FIG. 13) of the original image S(x, y, z, t, b) of the presently noted pixel.

In the equation (3) WT*RT[S(x, y, z, t, b)]*S(x, y, z, t, b) means that RT[S(x, y, z, t, b)] obtained as described above is multiplied by the load coefficient W1, and further multiplied by the pixel value of the original image S(x, y, z, t, b) of the noted pixel.

Moreover, similarly, in the equation (3) W2*RT[S(x, y, z, t, b)]*A(x, y, z, t, b) means that RT[S(x, y, z, t, b)] is multiplied by the load coefficient W2, and further multiplied by the pixel value in the low pass filter image A(x, y, z, t, b) of the noted pixel.

Therefore the equation (3) means that W1*RT[S(x, y, z, t, b)]*S(x, y, z, t, b) and W2*RT[S(x, y, z, t, b)]*A(x, y, z, t, b) are added to the pixel value of the noted pixel of the original image S(x, y, z, t, b). Here, the load coefficient W2 is provided with a minus value, and the equation (3) is therefore a calculation equation for reducing the blurred image component (low frequency component) to emphasize the high frequency component.

Here, when the frequency processing is performed only with constants W1, W2 without using an idea of the frequency emphasis type, emphasis is performed with respect to the whole density area at a fixed proportion, but with the chest image, a noise is amplified in the low density areas such as the mediastinum and diaphragm to inhibit image diagnosis, or in the lung field a lung tigroid or another normal structure is probably incorrectly diagnosed as an abnormal observation by excessive emphasis. Therefore, here, the defect is removed by introducing the idea of the frequency emphasis type.

The histogram analysis and window processing 2124 in the image processing section 212 shown in FIG. 4 will next be described.

Figure 15:
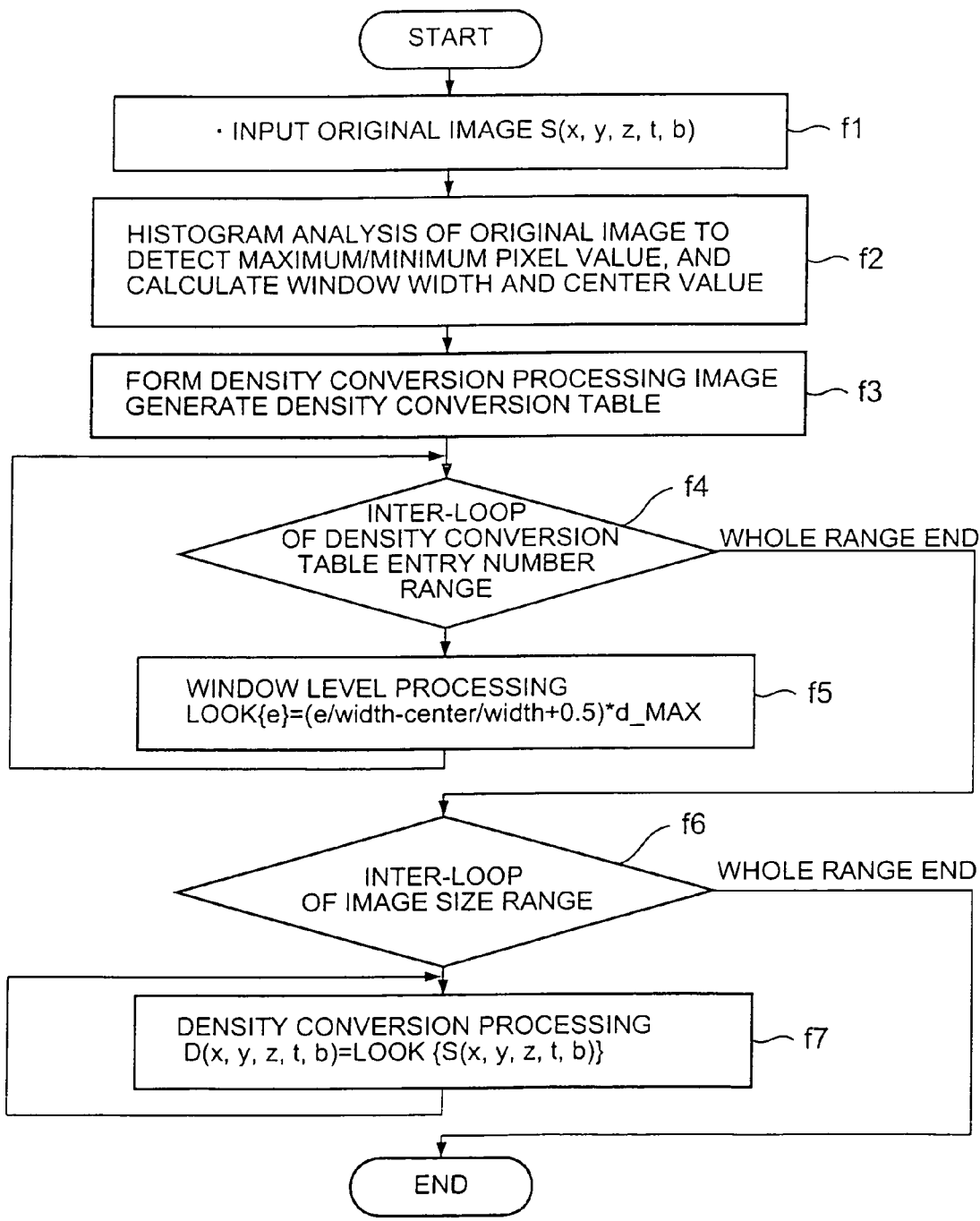
FIG. 15 is a flowchart of a histogram analysis and window processing program.

FIG. 15 is a flowchart of a histogram analysis and window processing program.

Here, first in step f1, the original image (image before this processing is performed) S(x, y, z, t, b) is inputted, and in step f2, histogram analysis of the original image is performed to detect maximum and minimum pixel values, and based on the values a window width (maximum pixel value−minimum pixel value) width, and center value ((maximum pixel value+minimum pixel value)/2) center are calculated.

In step f3, density conversion processing image D(x, y, z, t, b) and density conversion table LOOK{ } are generated. Additionally, this step f3 means that the area for storing these is secured, and actual data is prepared for the density conversion table LOOK{ } in step f5 and for the density conversion processing image D(x, y, z, t, b) in step f7.

It is judged in step f4 whether or not a window level processing in step f5 ends with respect to the whole density range, and when the processing has not end yet, the density conversion table LOOK{e} of the lookup table form is successively prepared for each density in accordance with the following:

$$LOOK\{e\}=(e/width-center/width+0.5)*d\_MAX \quad (4)$$

For this density conversion table LOOK{ }, for example, when the original image S(x, y, z, t, b) is displayed in the display screen 121 of the image display 120 shown in FIG. 1, the maximum density of the original image is converted to the maximum density (minimum luminance) d_MAX which can be represented on the image display screen 121, and the minimum density of the original image is converted to the minimum density (maximum luminance) 0.0 which can be represented on the density screen 121.

In step f5, the density conversion table LOOK{ } is successively prepared for each density value, and the processing ends with respect to the whole density range and then advances to step f6.

It is monitored in the step f6 whether or not the density conversion processing of step f7 ends with respect to the whole pixel range of the original image. When the processing has not ended yet, the processing advances to the step f7. The density conversion table LOOK{ } is referred to for each pixel and the original image S(x, y, z, t, b) is converted to the density conversion processing image D(x, y, z, t, b).

The density conversion processing image D(x, y, z, t, b) prepared in this manner is outputted from the image processing section 212 shown in FIGS. 3, 4 as an output image, and the output image is inputted, for example, to the image display section 213 shown in FIG. 3, and displayed/outputted, for example, on the display screen 121 shown in FIG. 1 as the image for diagnosis.

Here, as described above, by performing the image processing based on the image processing condition in accordance with the photography device type and photography condition of the medical image as described above, the output image superior in diagnosis aptitude can constantly be obtained irrespective of the medical image type.

Figure 16:
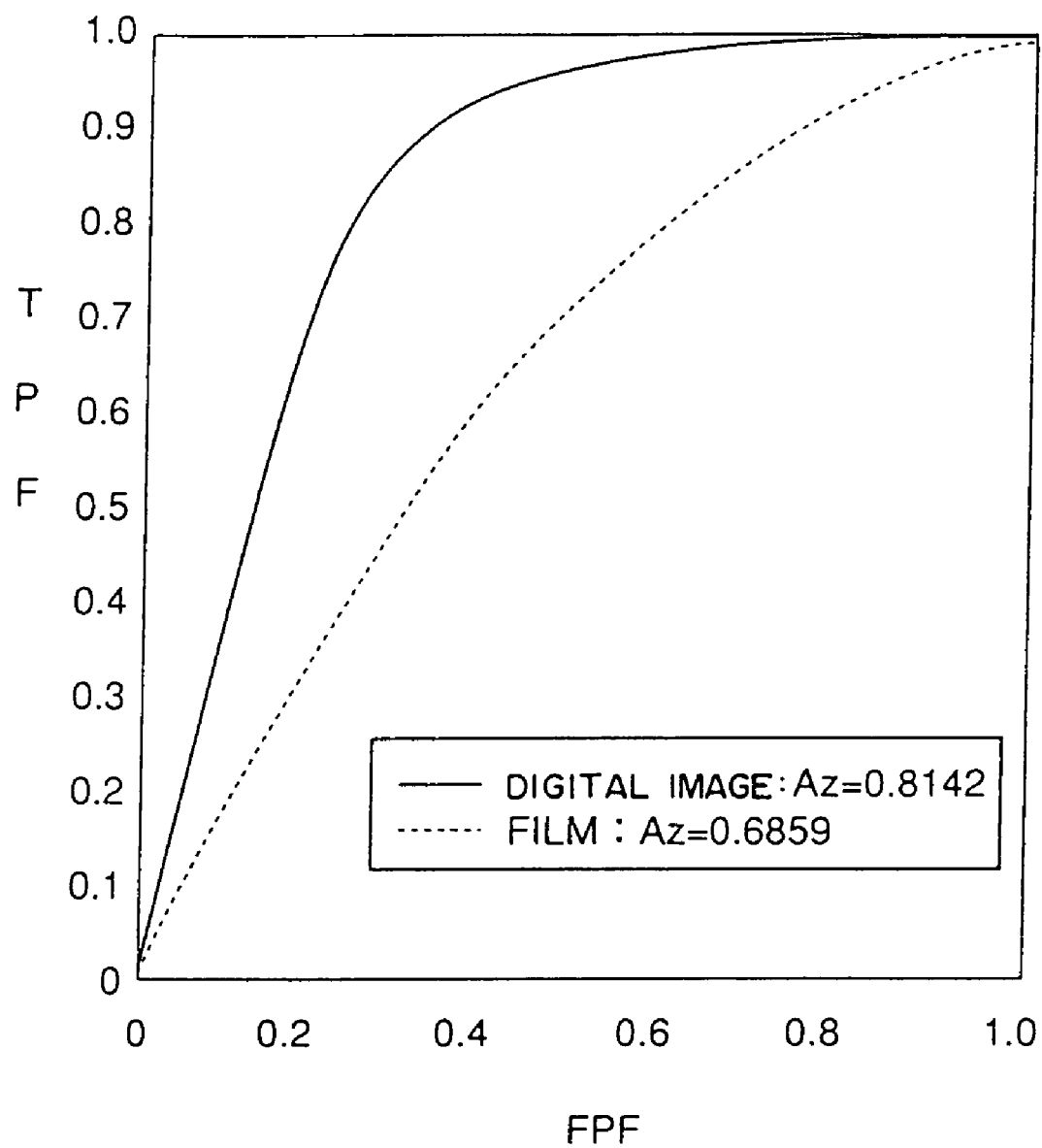
FIG. 16 is a chart showing one example of a processing effect by the present embodiment.

FIG. 16 is a chart showing one example of a processing effect according to the present embodiment.

Here, 23 cases in total of 15 cases of lung node patients (abnormal people) and 8 cases of normal patients in CR chest images were used and a radiography specialist of a radiation department experimented a digital image subjected to the image processing using the film and the present invention by a receiver operating characteristic analysis/evaluation method.

FIG. 16 is a chart showing the experiment result. A way of looking at FIG. 16 will be described.

Y-axis (TPF) of FIG. 16: a ratio at which abnormality is correctly judged as presence of abnormality.

X-axis (FPF) of FIG. 16: a ratio at which normality is incorrectly judged as presence of abnormality.

It is assumed by FIG. 16 that the closer an ROC curve approaches TPF=1.0, FPF=0.0, the better the characteristic becomes. In an ideal state, presentation of abnormality is necessarily judged as the presence of abnormality, presentation of normality is necessarily judged as the presence of normality, and the abnormality can completely be distinguished from the normality.

Moreover, Az in FIG. 16 is an area below the ROC curve, and Az equals 1.0 with TPF=1.0, FPF=0.0.

Therefore, from the result of FIG. 16, as compared with the film, the digital image subjected to the image processing using the present embodiment obtains a better result in diagnosis ability, abilities to extract a fine structure of a lung blood vessel and a mediastinum structure are enhanced, and an ability to detect a pathological change is effectively enhanced.

A mode of the basic image processing in the image processing section 212 of the image processing apparatus 200 shown in FIG. 2 has been described above, and modes of various operations and displays in the image processing apparatus 200 will be described hereinafter.

Figure 17:
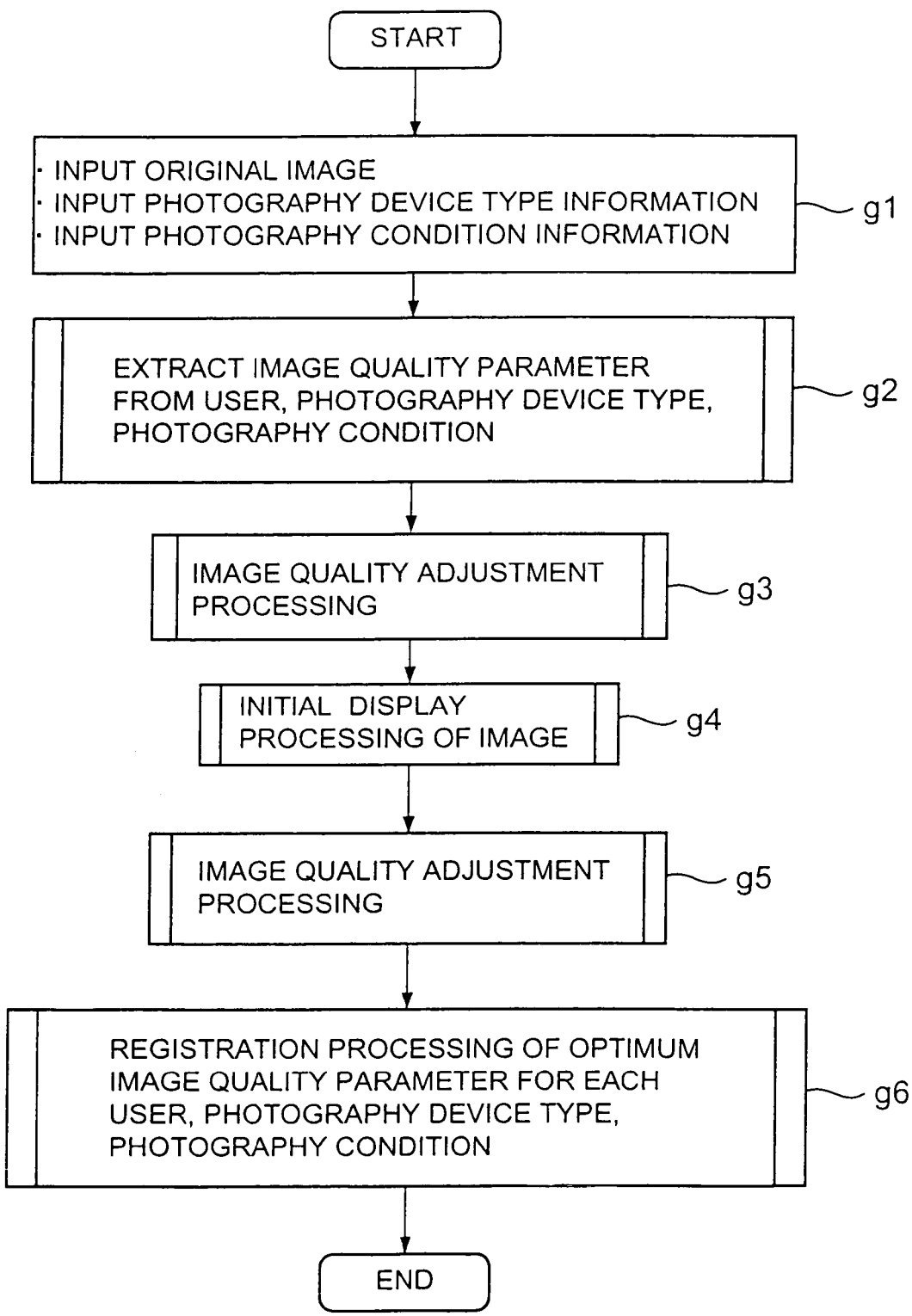
FIG. 17 is a flowchart showing an initial image display and showing registration and re-use of an image quality parameter for defining an image processing condition.

FIG. 17 is a flowchart showing registration and reuse of an image quality parameter for defining an image initial display and image processing condition.

Here, first the original image as a processing object (input image described with reference to FIG. 3) and the photography device type and photography condition when the original image is obtained are inputted (step g1). As described above, the original image and the photography device type and photography condition form one object. In the hard disk drive 113 of FIG. 2, a large number of objects are stored, and here the user opens a graphic user interface (GUI) screen (not shown) in which a list of objects is displayed to select a desired object on the screen.

Figure 25:
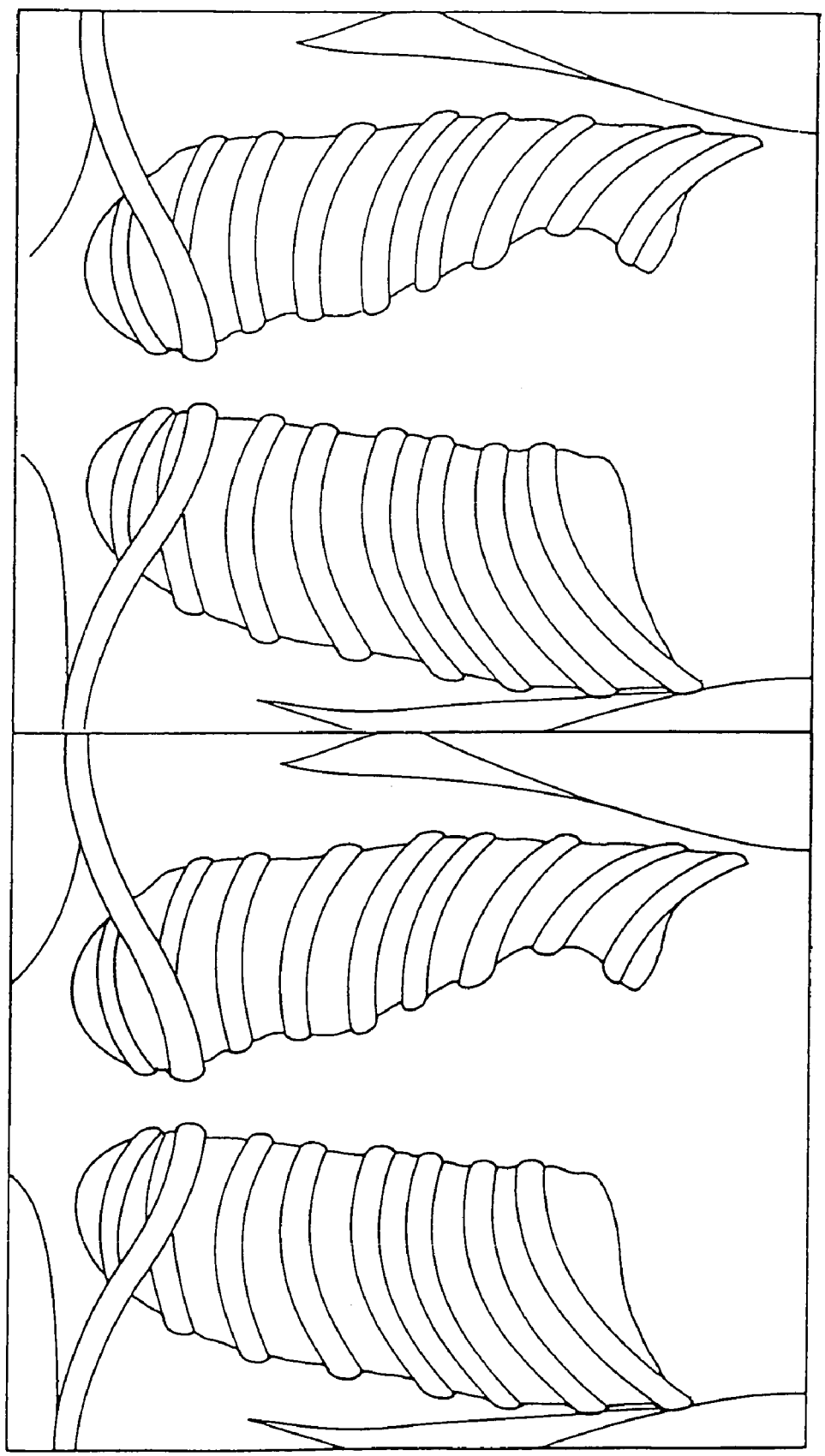
FIG. 25 is a diagram showing that two medical images are arranged and displayed.

In this manner, the object is read from the hard disk drive 113 and inputted into a routine shown in FIG. 17. Additionally, it is assumed here that only one object is selected, but a plurality of medical images are arranged and displayed simultaneously, for example, as shown in FIG. 25, and in this case the plurality of arranged and displayed objects are selected.

Moreover, when entering the routine, user authentication is performed by inputting a password or the like, and the image processing apparatus is also provided with information on the user.

In the image processing condition storing section 218 of the image processing apparatus 200 shown in FIG. 3, image quality parameters for determining a large number of image processing conditions are stored. In the image processing condition storing section 218, as described above, in addition to the image processing conditions (image quality parameters) for the photography device types and photography conditions, a large number of image processing conditions (image quality parameters) such as image processing conditions for one photography device type and photography condition and for a plurality of parts appearing in one medical image (e.g., lung field, mediastinum, rib, heart, diaphragm, and the like in the chest simple radiograph) are associated with the respective users and stored.

In step g2 of FIG. 17, from a large number of image quality parameters (image processing conditions), the image quality parameter as an initial value associated with the user using the image processing apparatus 200 (refer to FIG. 3) and the photography device type and photography condition in the object inputted in the step g1 or the image quality parameter employed in the past is extracted, in step g3 the original image in the object inputted in the step g1 is subjected to an image quality adjustment processing (image processing) in accordance with the image quality parameter extracted in the step g2, and in step g4 an initial image after the image quality adjustment processing (image processing) is displayed. Here, the image quality adjustment processing (image processing) includes various processings described with reference to FIG. 4.

Subsequently, when there is an unsatisfactory respect in the quality of the displayed medical image, the image quality parameter is adjusted to perform the image quality adjustment processing (step g5), and a processing of registering a finally obtained optimum image quality parameter is performed (step g6). Thereby, the image quality parameter optimum for the user is associated with the photography device type and photography condition and with the user and registered.

Figure 18:
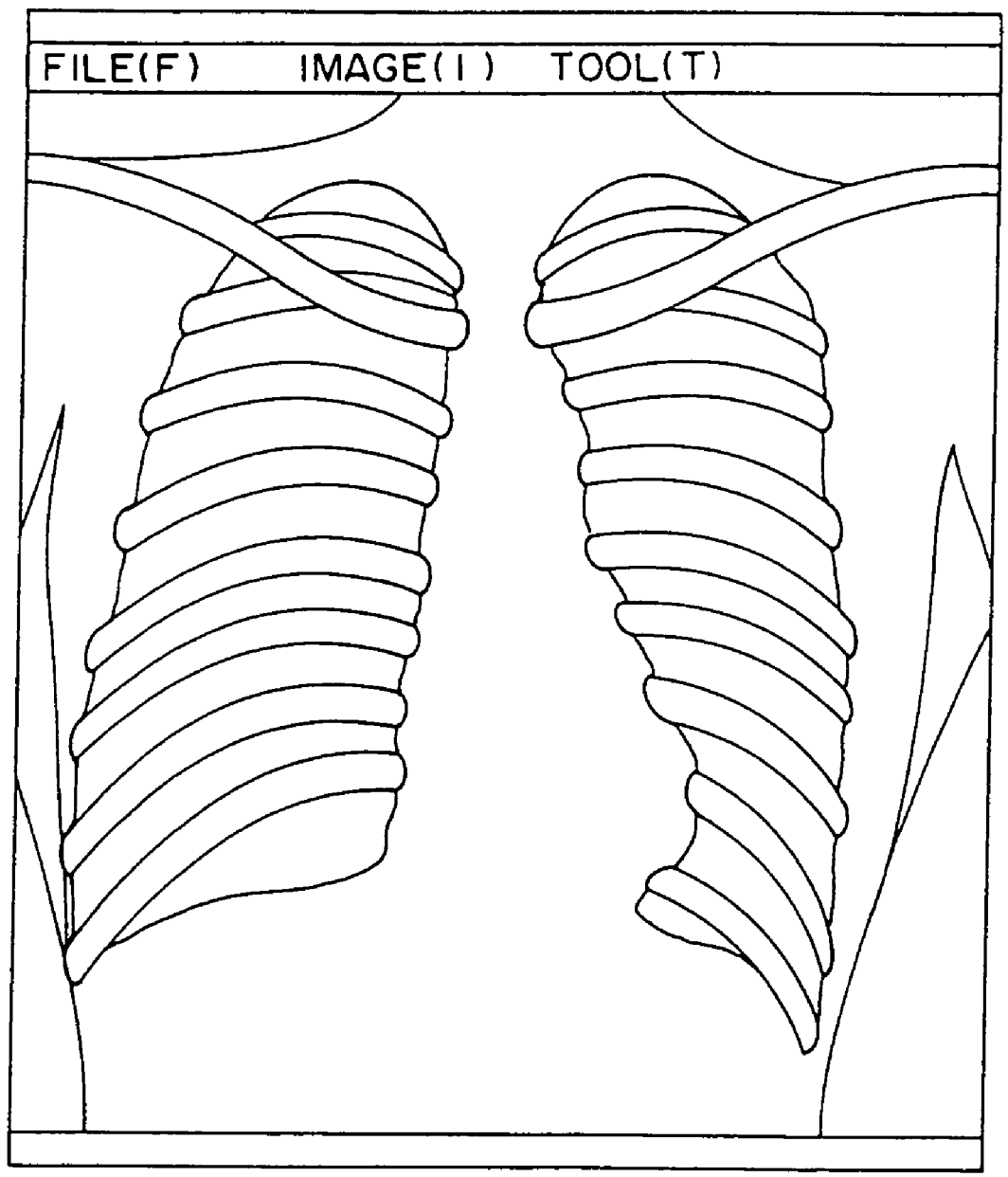
FIG. 18 is a diagram showing one example of the initial display image.

FIG. 18 is a diagram showing one example of the initial display image displayed in the step g4 of FIG. 17. This image is displayed on the display screen 121 of the image display 120 shown in FIG. 1 by the image display section 213 of the image processing apparatus 200 shown in FIG. 3.

Here, displayed are a chest front simple radiograph, and buttons of "file (F)", "image (I)", and "tool (T)" above the radiograph, to which a click operation by a mouse is performed.

When mouse-clicking the button "file (F)", a button "exit (X)" is displayed. The button "exit (X)" means the end of this application, and by mouse-clicking the button "exit (X)", an end confirmation message box is displayed.

By clicking the button "image (I)", an image quality adjustment dialog box is displayed. Details of the image quality adjustment dialog box will be described later.

When the button "tool (T)" is clicked, buttons "scanning processing (S)" and "masking (M)" are displayed. When the button "scanning processing (S)" is mouse-clicked, a scanning dialog box is displayed. On the other hand, by clicking the button "masking (M)", a masking dialog box is displayed. Details of the scanning dialog box and masking dialog box will be described later.

Figure 20:
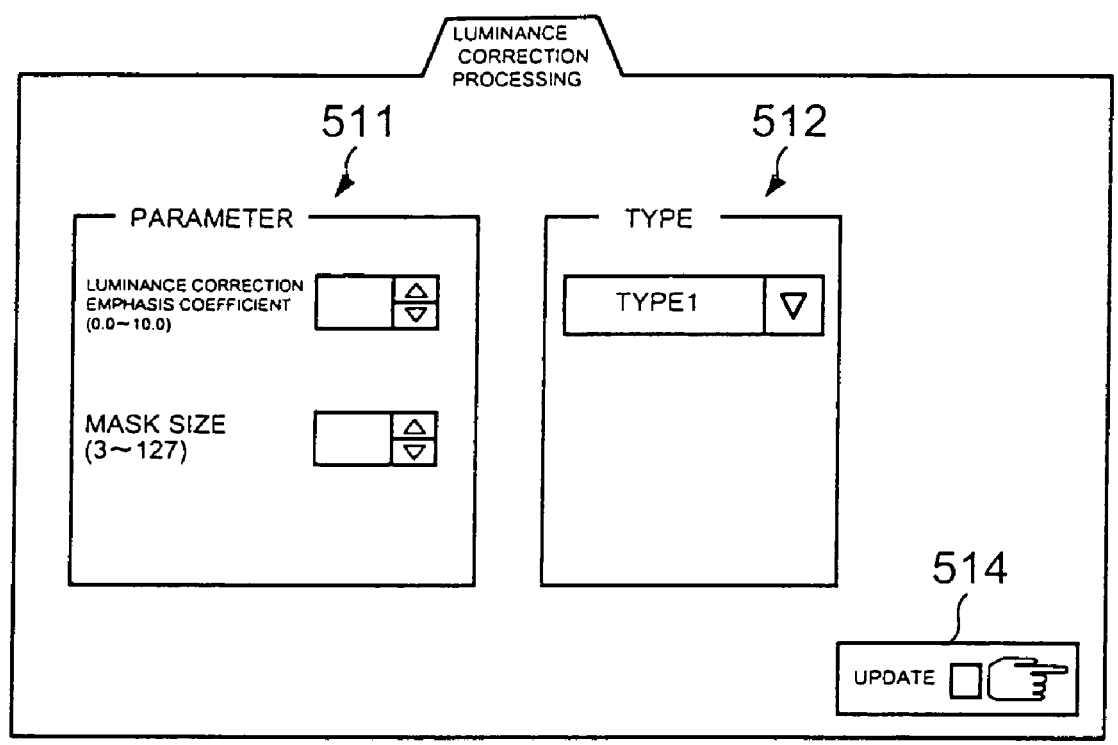
FIG. 20 is a diagram showing the image quality adjustment dialog box (luminance correction processing).
Figure 21:
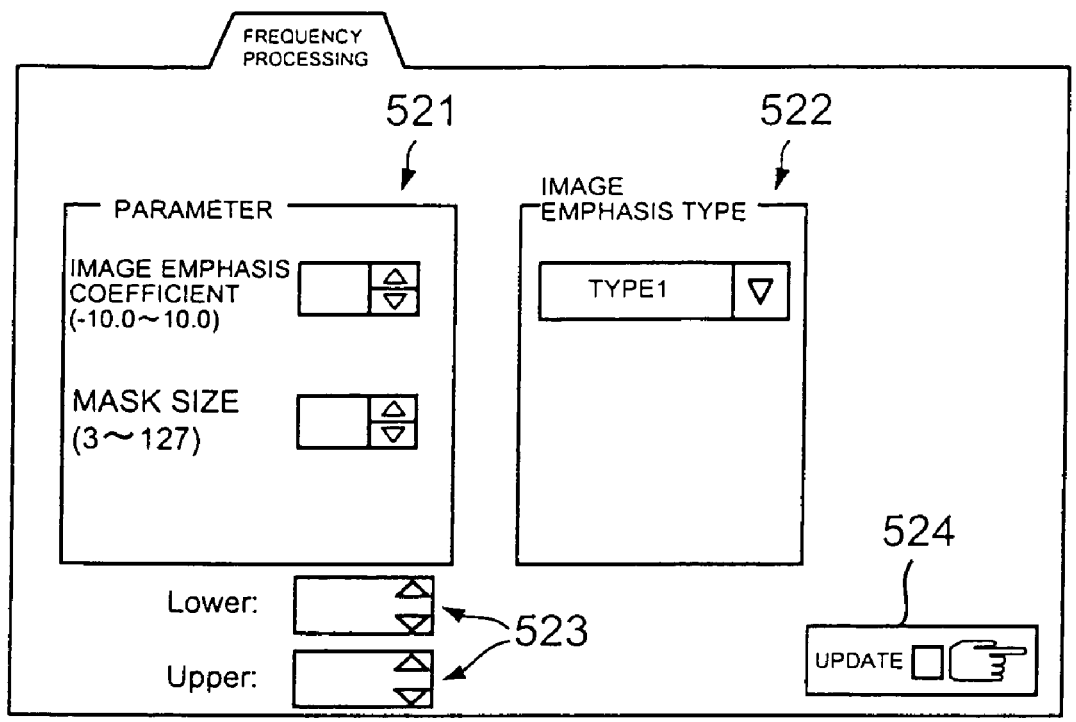
FIG. 21 is a diagram showing the image quality adjustment dialog box (frequency processing).
Figure 22:
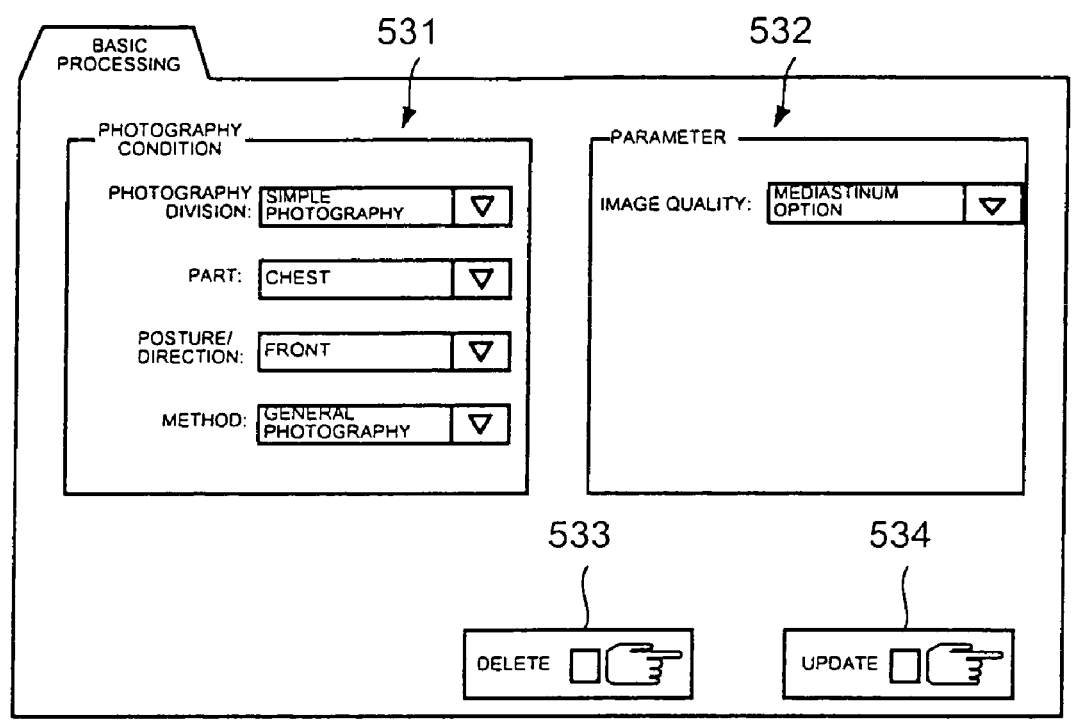
FIG. 22 is a diagram showing the image quality adjustment dialog box (basic processing).

The image quality dialog box is provided with tags "gradation processing", "luminance correction processing", "frequency processing", and "basic processing". For FIGS. 19 to 22, FIG. 19 shows a screen displayed by mouse-clicking the tag "gradation processing", FIG. 20 shows a screen displayed by mouse-clicking the tag "luminance correction processing", FIG. 21 shows a screen displayed by mouse-clicking the tag "frequency processing", and FIG. 22 shows a screen displayed by mouse-clicking the tag "frequency processing" "basic processing".

The "gradation processing" is a screen for adjusting the image quality parameter (gradation processing parameter; see Tables 1 to 3) for the gradation processing, "luminance correction processing" is a screen for adjusting the image quality parameter (luminance correction processing parameter; see Tables 1 to 3) for the luminance correction processing, "frequency processing" is a screen for adjusting the image quality parameter (frequency parameter; see Tables 1 to 3) for the frequency processing, and "basic processing" is a screen for the basic processing (preset selection).

Figure 19:
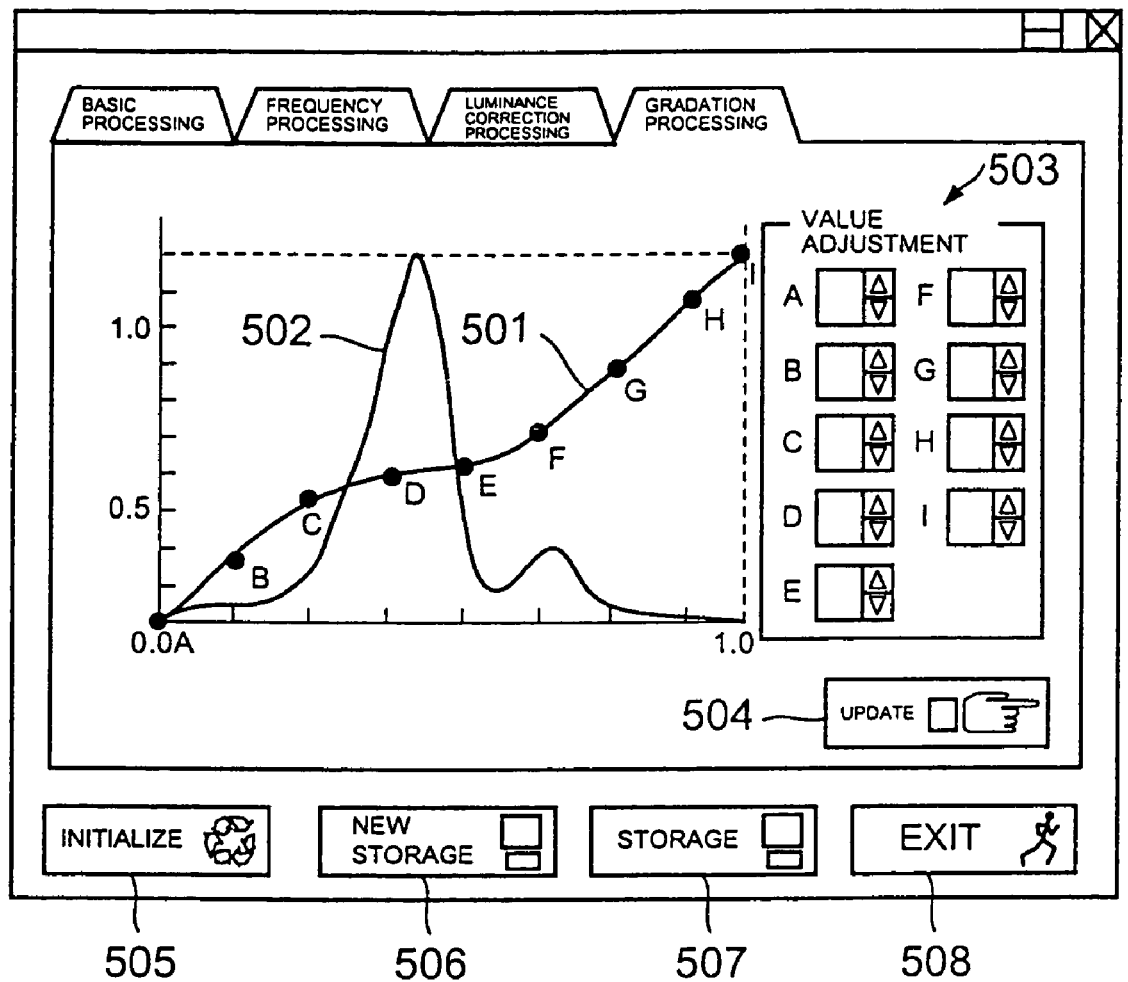
FIG. 19 is a diagram showing an image quality adjustment dialog box (gradation processing).

In the screen for adjusting the "gradation processing" shown in FIG. 19, a curve 501 showing a correspondence between the pixel value of the original image (image before the gradation conversion processing here) and the pixel value of the gradation conversion processing image also shown in FIG. 11, and a histogram 502 of the pixel value of the original image are displayed, and on the right side a combo box 503 for adjusting the value of the curve 501 (points A to I) is displayed. By inputting a numeric value directly into the combo box 503 for adjusting the value, or mouse-clicking mark "Δ" "∇" for adjusting the value, the value is adjusted. Alternatively, by picking and vertically moving the respective points A to I of the curve 501, the numeric value is displayed in the value adjusting combo box 503 and the curve 501 is changed to a curve in accordance with the numeric value.

By adjusting the curve 501 in this manner and clicking an "update" button 504, the original image (original image inputted in the step g1 of FIG. 17) of the displayed medical image (see FIG. 18) is subjected to a series of image quality adjustment processings including the gradation processing in which the gradation processing parameter after the adjustment is reflected, and the displayed medical image (see FIG. 18) is replaced with the medical image after this present image quality adjustment. The user can therefore confirm an influence of this parameter adjustment on the display image.

FIG. 19 further shows an "initialize" button 505, "new storage" button 506, "storage" button 507, and "exit" button 508, and these buttons will be described later in detail.

FIG. 20 shows the screen displayed by mouse-clicking the tag "luminance correction processing".

FIG. 20 only shows the tag "luminance correction processing", and omits but shows the respective tags "basic processing", "frequency processing", and "gradation processing" similarly as FIG. 19, and also shows the respective buttons 505 to 508 of "initialize", "new storage", "storage", "exit" in a bottom similarly as FIG. 19.

In the screen of FIG. 20, a parameter adjusting combo box 511 and type selecting combo box 512 appear, and in the parameter adjusting combo box 511 the load coefficient (0.0 to 10.0) and mask size (3 to 127) are adjusted. The load coefficient indicates a value of coefficient weight of the equation (2) used in the description of the luminance correction processing, and the mask size indicates the size of H(x, y) appearing in the equation (1).

Moreover, in the type selecting combo box 512, any curve shown in FIG. 8 (a solid-line curve and a dashed-line curve are shown here) is selected.

By mouse-clicking an "update" button 514, the original image inputted in the step g1 of FIG. 17 is subjected to the image quality adjustment processing in which the presently adjusted parameter for the luminance correction processing is reflected, and instead of the displayed medical image shown in FIG. 18, the medical image subjected to the presently newly performed image quality adjustment processing is displayed.

FIG. 21 shows a screen displayed by mouse-clicking the tag "frequency processing", and in these screens, the parameter for the frequency processing is adjusted.

FIG. 21 only shows the tag "frequency processing", and omits similarly as FIG. 20 but shows the respective tags "basic processing", "luminance correction processing", and "gradation processing" similarly as FIG. 19, and also shows the respective buttons 505 to 508 of "initialize", "new storage", "storage", "exit" in the bottom similarly as FIG. 19.

In the screen of FIG. 21, a parameter adjusting combo box 521, type selecting combo box 522, and upper and lower limit value adjustment columns 523 appear, and in the parameter adjusting combo box 521 the load coefficient (−10.0 to 10.0) and mask size (3 to 127) are adjusted. The load coefficient indicates values of coefficients W1, W2 (additionally W2=−W1) of the equation (3) used in the description of the frequency processing, and the mask size indicates the size of the impulse response array H(x, y).

Moreover, the type selecting combo box 522, any frequency emphasis type is selected from a plurality of frequency emphasis types shown in FIG. 13, and in the upper and lower limit value adjustment columns 523, the lower limit value (Lower) and upper limit value (Upper) to which the selected frequency emphasis type is applied are adjusted.

By mouse-clicking an "update" button 524, the original image inputted in the step g1 of FIG. 17 is subjected to the image quality adjustment processing in which the presently adjusted parameter for the frequency processing is reflected, and instead of the displayed medical image shown in FIG. 18, the medical image subjected to the presently newly performed image quality adjustment processing is displayed.

FIG. 22 shows the screen displayed by mouse-clicking the tag "basic processing", and in these screens the buttons common with the respective tags are arranged.

FIG. 22 only shows the tag "basic processing" for reasons similar to those of FIGS. 20, 21, also shows the respective tags of "frequency processing", "luminance correction processing", and "gradation processing" similarly as FIG. 19, and also shows the respective buttons 505 to 508 of "initialize", "new storage", "storage", "exit" in the bottom.

In the screen of FIG. 22, a photography condition selecting combo box 531 and parameter adjusting combo box 532 are displayed. In the photography condition selecting combo box 531 the photography condition is selected, and in the parameter adjusting combo box J32 the image quality is selected. The "image quality" is here associated with a plurality of parts (e.g., lung field, mediastinum, rib, heart, diaphragm, and the like) appearing in one medical image (e.g., the chest X-ray image).

When clicking a "delete" button 533, the parameters of the gradation processing, luminance correction processing, and frequency processing concerning the part selected by the parameter adjusting combo box 532 are deleted.

Moreover, by clicking an "update" button 534, the medical image subjected to the image quality adjustment processing by the presently set image quality parameter is displayed.

Here, the respective update buttons 504, 514, 524, 534 of FIGS. 19 to 22 constitute the same action, and even by mouse-clicking the update button in any screen, the image quality adjustment processing is performed in which all the parameters of the latest adjusted gradation processing, luminance correction processing, and frequency processing are reflected.

Furthermore, by mouse-clicking the "initialize" button 505 representatively shown in FIG. 19, the image quality parameters before mouse-clicking the presently adjusted "storage" button 507 (or "new storage" button 506) are all returned back to original values.

Additionally, by mouse-clicking the "new storage" button 506, the adjusted image quality parameter is associated with the photography condition and part ("image quality") set in the basic processing screen (see FIG. 22), and a new image processing condition is prepared as illustrated in Tables 1 to 3.

Moreover, by mouse-clicking the "storage" button 507, the initial image processing condition extracted in the step g2 of FIG. 17 is rewritten to the image processing condition provided with the presently adjusted image quality parameter.

The "exit" button 508 closes the image quality adjustment combo box (FIGS. 19 to 22).

In the present embodiment, as described above, the image quality parameter (image processing condition) is added, updated, or deleted.

Figure 23:
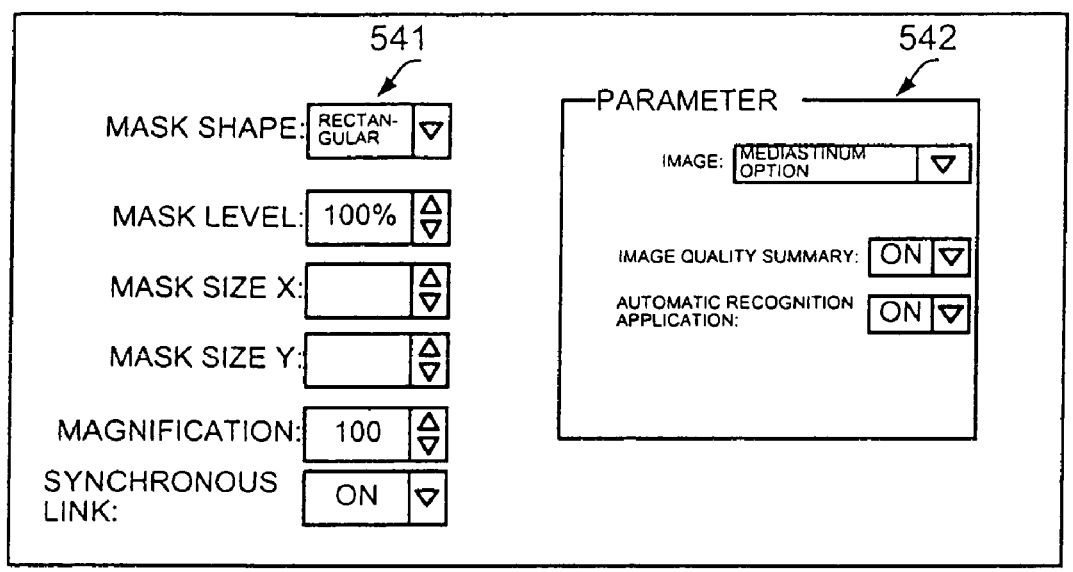
FIG. 23 is a diagram showing a masking dialog box.

FIG. 23 is a diagram showing the masking dialog box. The masking dialog box is displayed by mouse-clicking the "tool (T)" button on the screen of FIG. 18, and clicking the "masking (M)" button among the displayed buttons.

In the masking dialog box shown in FIG. 23, a mask parameter setting column 541 and image quality combo box 542 are displayed. These will be described later.

Figure 24:
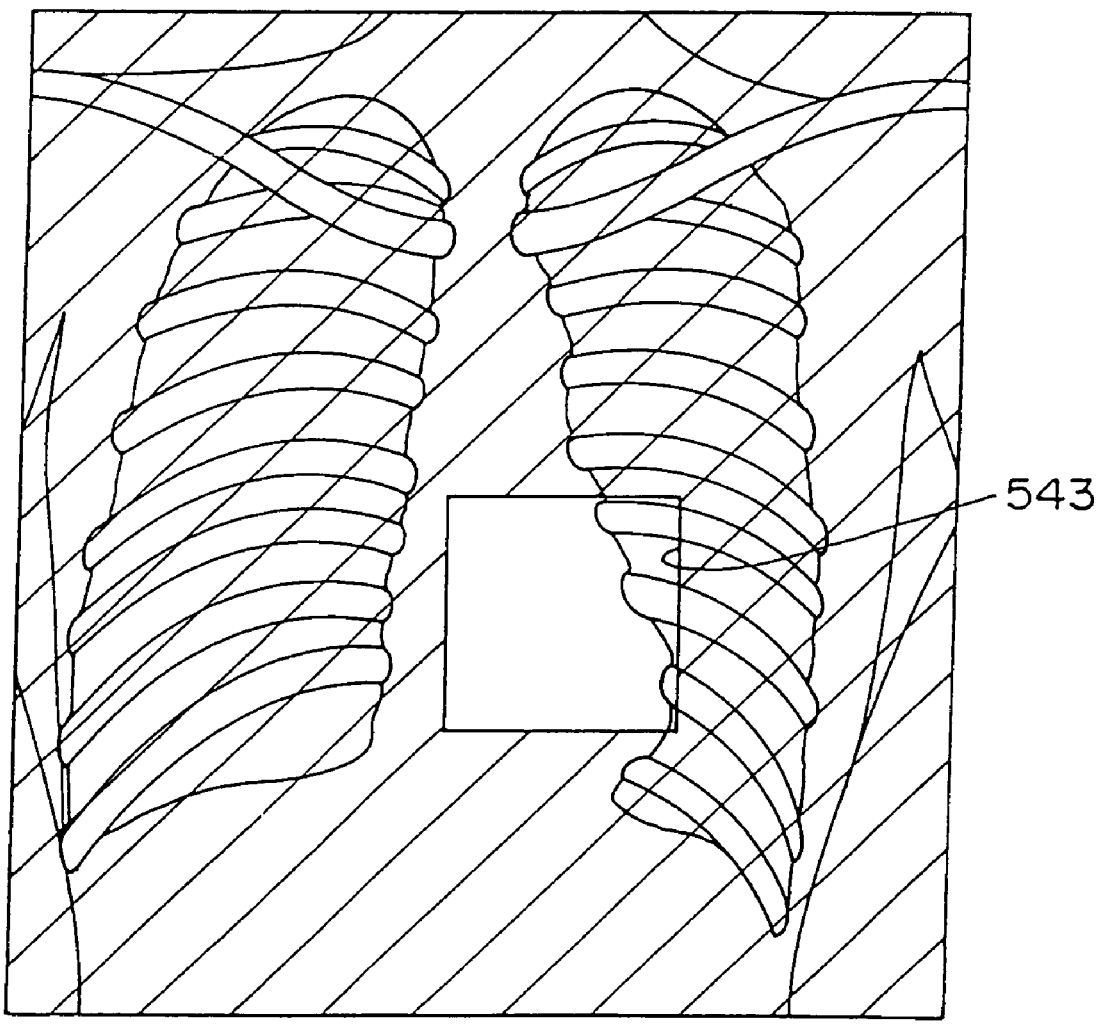
FIG. 24 is a diagram showing one example of a medical image subjected to a masking processing.

FIG. 24 is a diagram showing one example of the medical image subjected to a masking processing.

When the masking processing is performed, the original image is displayed only in a set area of interest 543, and a dark image with the lowered luminance for the designated coefficient (mask level) is displayed in the area except the area of interest 543.

Turning back to FIG. 23, the masking dialog box of FIG. 23 will be described.

In the mask parameter setting column 541 of the masking dialog box, a shape of the area of interest (mask shape; rectangular or circular), brightness of the area except the area of interest (mask level), dimension of the area of interest (mask size X, mask size Y), magnification of the image in the area of interest, and on/off of "synchronous link" (described later) are set. The center point of the area of interest is designated by placing a mask cursor in a desired position on the screen shown in FIG. 18 and clicking the cursor.

FIG. 25 is a diagram showing that two medical images are arranged and displayed.

This embodiment is provided with a mode in which in the step g1 of FIG. 17 another image (comparative image) is inputted together with the original image, and these two medical images are arranged and displayed as shown in FIG. 25. In this case, by turning on the "synchronous link", a "synchronous link processing" is performed, the position and dimension of the area of interest designated with respect to the original image are also effective with respect to the comparative image, and the same area of interest is set with respect to two medical images. In this manner, the past and present images of the same patient are arranged, compared with each other and observed, which is convenient for observation.

Moreover, in the image quality combo box 542 of the masking dialog box of FIG. 23, "image quality", "image quality application", "automatic recognition application" are set.

For the "image quality", with respect to the area of interest, it is designated the image quality parameter for performing the quality adjustment processing among a plurality of image quality parameters, each of which parameters is suitable for observation of each part selected from a plurality parts of a body.

Moreover, for the "image quality application", with respect to the designated area of interest, it is selected whether the image quality adjustment processing using the image quality parameter selected in the "image quality", or simply the masking processing of the original image is to be performed.

Furthermore, when the "automatic recognition processing" is turned on, the part appearing in the area of interest of the display image is automatically recognized, and the image quality adjustment processing is performed in accordance with the recognized part and reflected in the display image. In his case, even when the part is designated in the column of "image quality", the automatically recognized part has priority.

Figure 26:
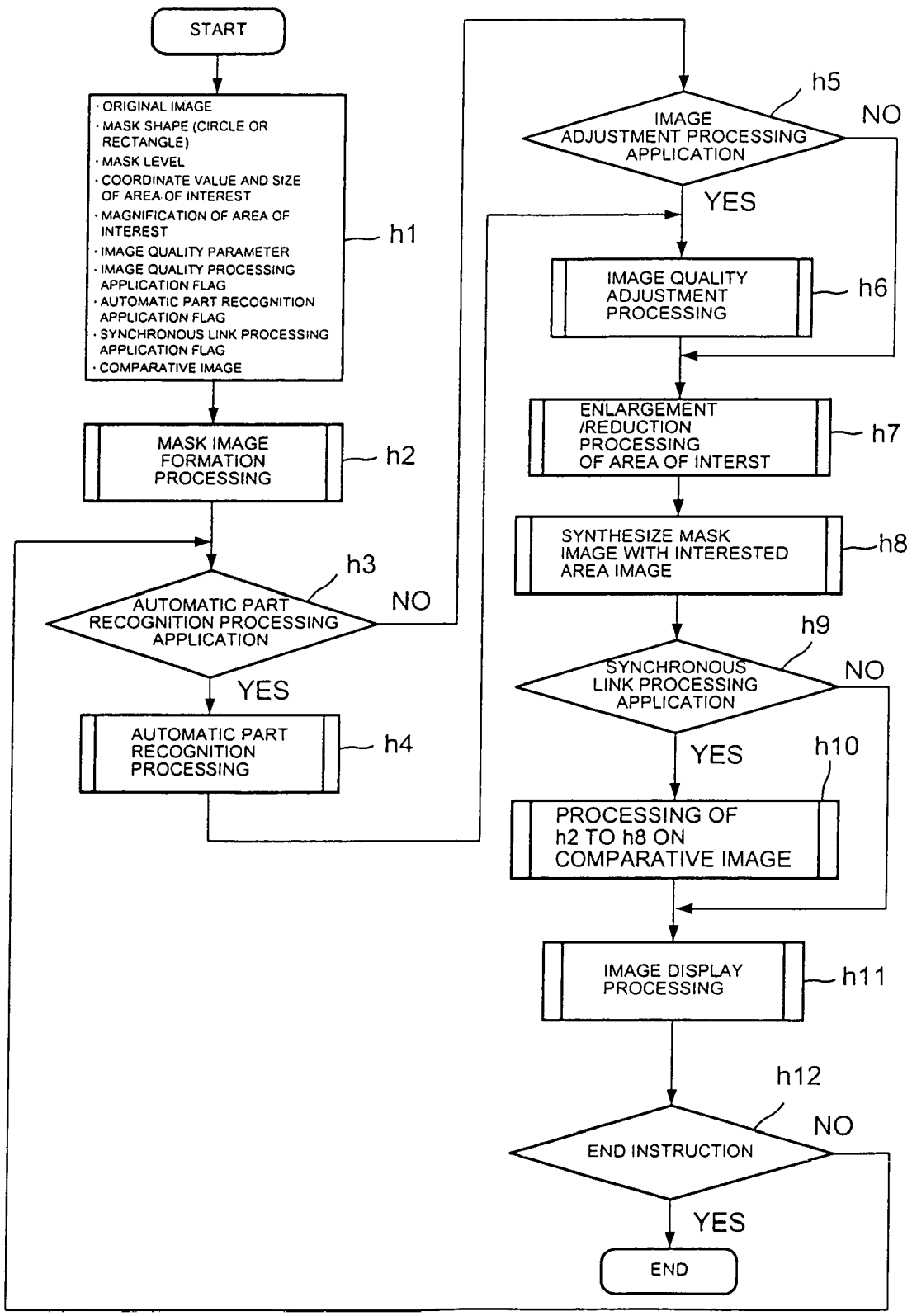
FIG. 26 is a flowchart of the masking processing.

FIG. 26 is a flowchart of the masking processing.

Here, first the original image, and various parameters or flags for the masking processing are inputted, and the comparative image is also inputted as occasion demands (step h1). Among these, the original image and comparative image are inputted beforehand in the step g1 of FIG. 17, and the parameter and flag are inputted on the masking dialog box of FIG. 23.

In the next step h2, a mask image is generated as follows.

The original image is set to S(x, y, z, t, b), and the mask image is set to D(x, y, z, t, b). Here, as described above, x, y, z, t, b denote the position of the horizontal direction, position of the vertical direction, depth, time, and band, respectively. The z (depth) indicates a case in which three-dimensional information obtained by MRI or the like is handled, t (time) denotes a case in which time information (dynamic image) of ultrasonic wave, endoscope or the like is handled, and b (band) denotes distinction of R, G, B, for example, when an image of three colors R, G, B is handled.

Moreover, when the mask level (0.0 to 1.0) is set to Level, and black pixel value is set to Black, the mask image D(x, y, z, t, b) is formed based on the following equation:

$$D(x,y,z,t,b) = (1.0 - \text{Level}) * S(x,y,z,t,b) + (\text{Level} \cdot \text{Black}) \quad (5)$$

The mask image D(x, y, z, t, b) is an image in which the luminance of the original image S(x, y, z, t, b) is lowered in accordance with the mask level Level.

It is judged in step h3 whether an automatic part recognition processing application flag is on/off. When the automatic part recognition processing flag is on, in step h4 the automatic part recognition processing is executed. The automatic part recognition processing will be described later.

Moreover, it is judged in step h5 whether an image quality adjustment processing application flag is on/off. When the flag is on, the processing advances to step h6 to execute the image quality adjustment processing.

Furthermore, in step h7, an enlargement/reduction processing of the area of interest is performed, and in step h8, the potion of the area of interest in the mask image is replaced with the image (image of area of interest) constituted by extracting only the area of interest after the image quality adjustment processing.

Additionally, it is judged in step h9 whether a synchronous link processing application flag is on/off. When the flag is on, in step h10, also the comparative image is subjected to the processing of steps h2 to h8.

In step h11, the image subjected to the masking processing in this manner is displayed.

It is judged in step h12 whether the next mouse operation for the user indicates the end of the masking processing, or the instruction for the new masking processing of designating a new area of interest. In an end processing, this masking processing is ended, the masking image is closed, and the usual display image without any masking is recovered. When the new masking processing is designated, the processing returns to the step h3.

The image in which the area of interest is easily observed is displayed by the aforementioned masking processing.

Figure 27:
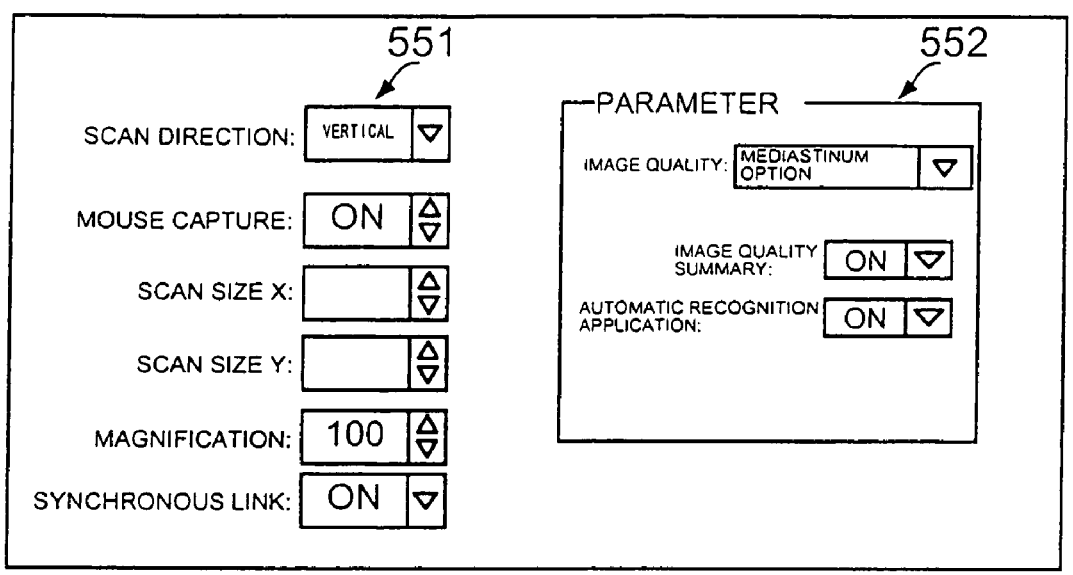
FIG. 27 is a diagram showing a scanning dialog box.

FIG. 27 is a diagram showing a scanning dialog box. This scanning dialog box is displayed by mouse-clicking the "tool (T)" button on the screen of FIG. 18, and clicking "scanning (S) button among the displayed buttons.

In the scanning dialog box shown in FIG. 27, a scanning parameter setting column 551 and image quality combo box 552 are displayed. These will be described later.

Figure 28:
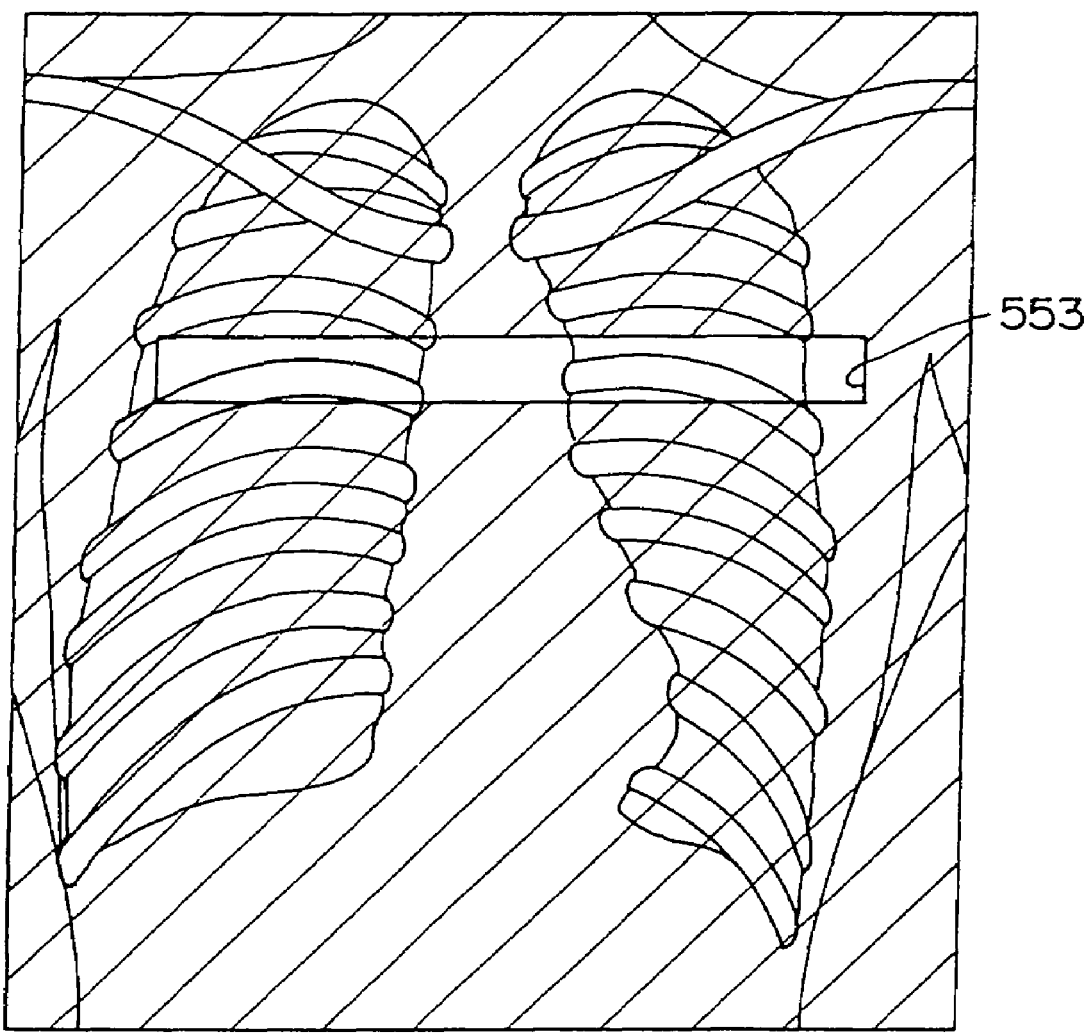
FIG. 28 is a diagram showing the medical image subjected to a scanning processing.

FIG. 28 is a diagram showing the display image subjected to the scanning processing.

When the scanning processing is performed, only an area of interest 553 is displayed, and the area except the area of interest 553 is masked. The area of interest 553 is scanned downward from the top of the screen in the example shown in FIG. 28.

Turning back to FIG. 27, the scanning dialog box of FIG. 27 will be described.

In the scanning parameter setting column 551 of the scanning dialog box, a scan direction (vertical direction or horizontal direction), mouse capture (on: repeated scanning/off: only one scanning), dimension of area of interest (scan size X, scan size Y), magnification of the image in the area of interest, and on/off of the "synchronous link" are set. The center point of the area of interest is designated by placing a mouse cursor in the desired position on the screen shown in FIG. 1 and clicking the cursor.

By turning on the "synchronous link", the synchronous link processing is performed, the position and dimension of the area of interest designated with respect to the original image are also effective with respect to the comparative image, and the same area of interest is set with respect to two display images. The area of interest is synchronized and scanned in the same direction. In this manner, the past and present images of the same patient are arranged, compared with each other and observed, which is convenient for observation. This scanning processing is effective in examining symmetry of a human body. As the scan direction "horizontal" can be set, so that sideways display of the image is handled.

Moreover, in the image quality combo box 552 of the scanning dialog box of FIG. 27, "image quality", "image quality application", "automatic recognition application" are set. These are the same as those of the image quality combo box 542 of the masking processing screen of FIG. 23, and redundant description is omitted.

Figure 29:
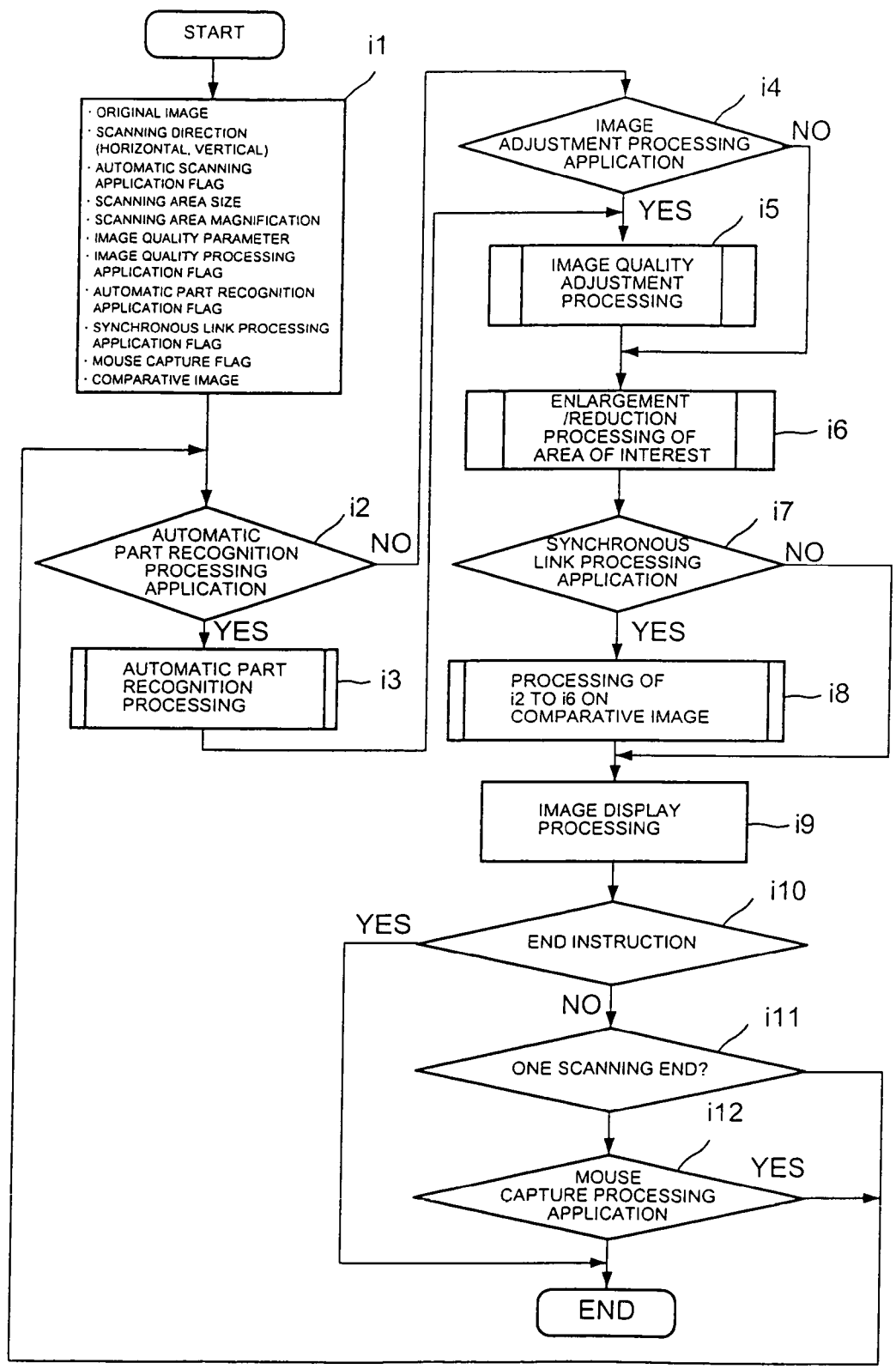
FIG. 29 is a flowchart of the scanning processing.

FIG. 29 is a flowchart of the scanning processing.

Here, first the original image, and various parameters and flags for the scanning processing are inputted, and the comparative image is also inputted as occasion demands (step i1). Among these, the original image and comparative image are inputted beforehand in the step g1 of FIG. 17, and other parameters and flags are inputted on the scanning dialog box of FIG. 27.

It is judged in the next Step i2 whether an automatic part recognition processing application flag is on/off. When the automatic part recognition processing application flag is on, the automatic part recognition processing is executed in step i3.

Moreover, it is judged in step i4 whether the image quality adjustment processing application flag is on/off, and when the flag is on, the processing advances to step i5 to execute the image quality adjustment processing.

Furthermore, the enlargement/reduction processing of the area of interest is performed in step i6, further it is judged in step i7 whether the synchronous link processing application flag is on/off, and when the flag is on, in step i8, the comparative image is also subjected to the processing of steps i2 to i6.

In step i9, the image subjected to the scanning processing in this manner is displayed.

It is judged in step i10 whether or not the instruction for ending the scanning processing by the user is given, and with the end instruction, this scanning processing ends, the scanning screen is closed and the usual display image is returned.

It is judged in step i11 whether or not one scanning of the area of interest ends. When the scanning has not ended yet, the processing returns to the step i2 to repeat the similar processing on the area of interest which has slightly moved from the position of the previous area of interest.

When it is judged in the step i11 that one scanning ends, the processing advances to step i12 to judge whether a mouse capture processing application flag is on/off. When no mouse capture processing is applied, the scanning processing is ended. When the mouse capture processing is applied, the processing returns to the step i2, and the similar processing is repeated with respect to the area of interest which has returned to a head position.

Additionally, by operating a mouse during execution of the scanning processing the area of interest stops, and by operating the mouse again the scanning of the area of interest is continued.

Figure 30:
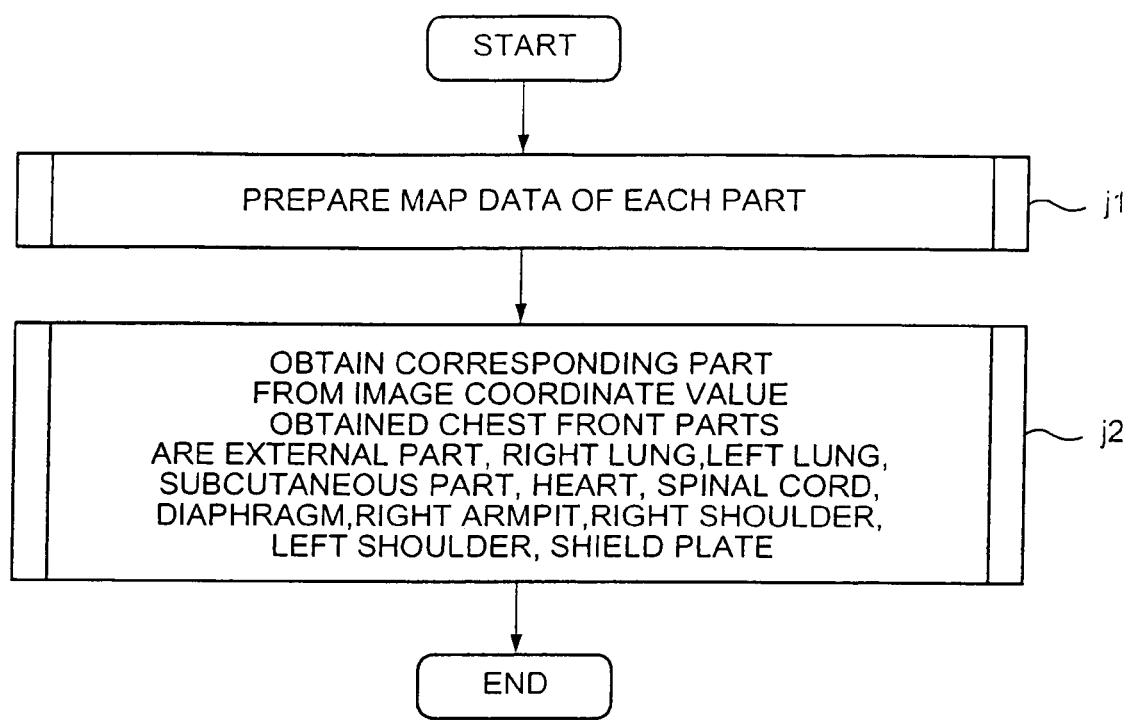
FIG. 30 is a flowchart of an automatic part recognition processing.

FIG. 30 is a flowchart of the automatic part recognition processing. The automatic part recognition processing is executed by the step h4 of the masking processing (FIG. 26), or the step i3 of the scanning processing (FIG. 29). Additionally, step j1 of the automatic part recognition processing is executed only for the first time, and only step j2 is executed for the second and subsequent times with respect to the same image.

In the step j1, map data indicating respective part positions in one piece of medical image is prepare, and in the step j2, the part appearing in the area of interest is recognized based on the prepared map data.

FIGS. 31 to 42 are explanatory views of a map data preparation processing procedure in the step j1 of FIG. 30. Here, the recognition processing of the respective parts in the chest front simple radiophotography image will be described.

Figure 31:
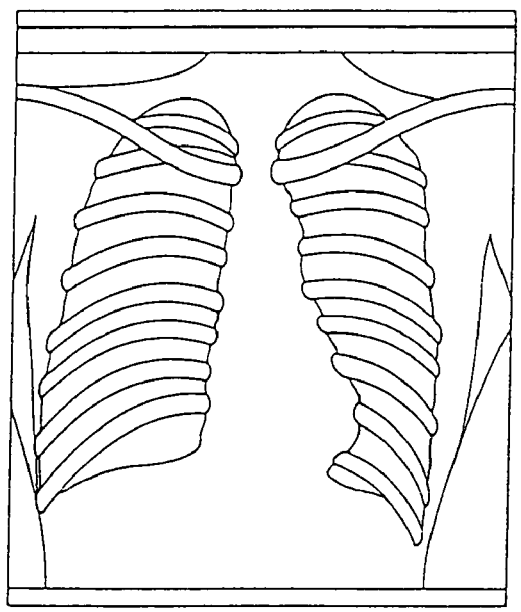
FIG. 31 is an explanatory view of a map data preparation processing procedure.

(1) The pixel of the original image is curtailed to ⅛ to form a reduced image (FIG. 31).

Figure 32:
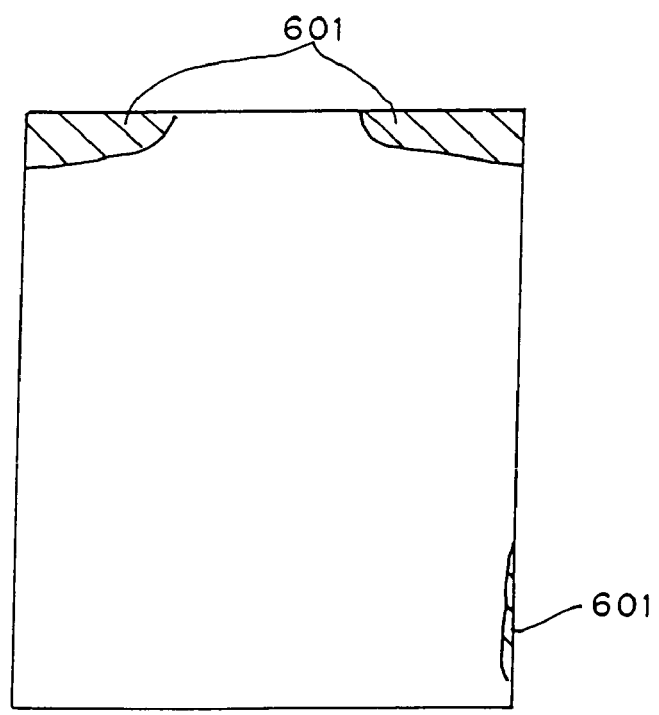
FIG. 32 is an explanatory view of the map data preparation processing procedure.

(2) By subjecting the luminance to a threshold value processing "external part" is obtained (FIG. 32).

Figure 33:
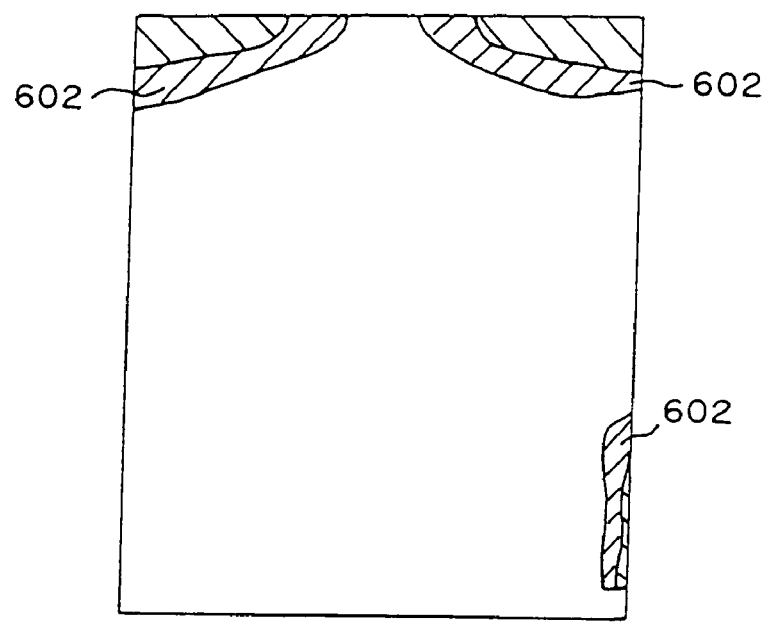
FIG. 33 is an explanatory view of the map data preparation processing procedure.

(3) By positional information that the part is adjacent to the "external part" 601 and the threshold value processing "subcutaneous part" 602 is obtained (FIG. 33).

Figure 34:
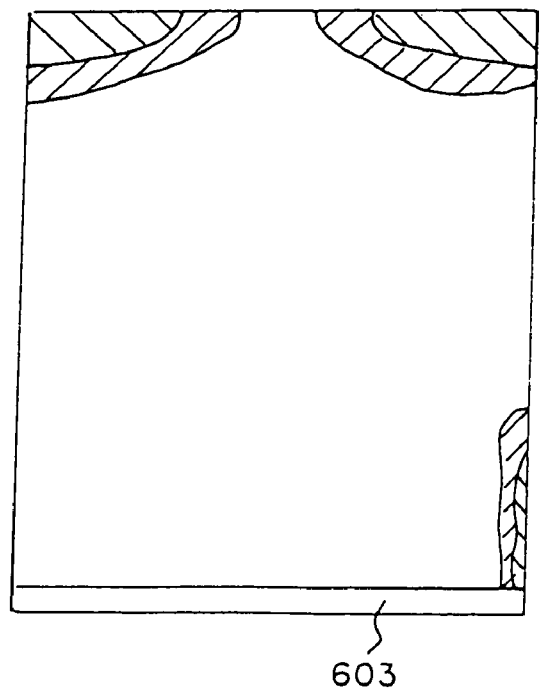
FIG. 34 is an explanatory view of the map data preparation processing procedure.

(4) From information that the "external" and "subcutaneous" parts are rapidly cut off on the luminance value "shield plate" 603 is obtained (FIG. 34).

Figure 35:
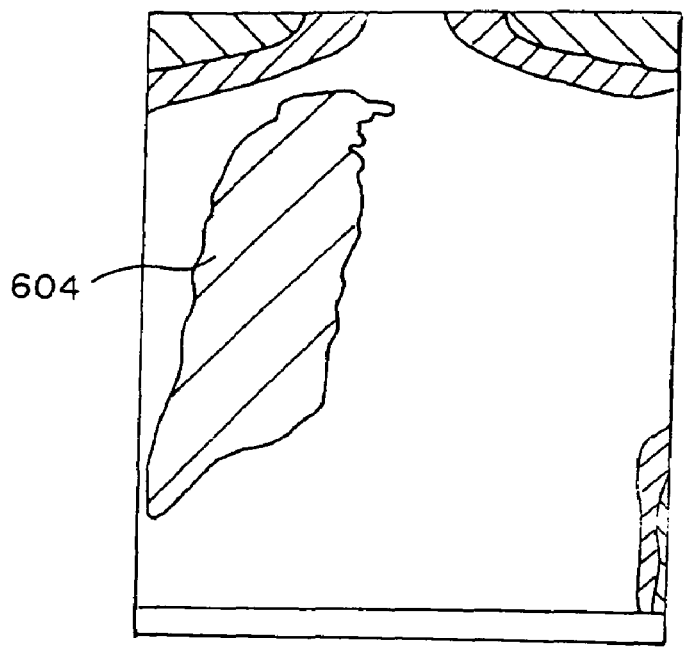
FIG. 35 is an explanatory view of the map data preparation processing procedure.

(5) Based on the positional information on the image and threshold value processing "right lung" 604 is obtained (FIG. 35).

Figure 36:
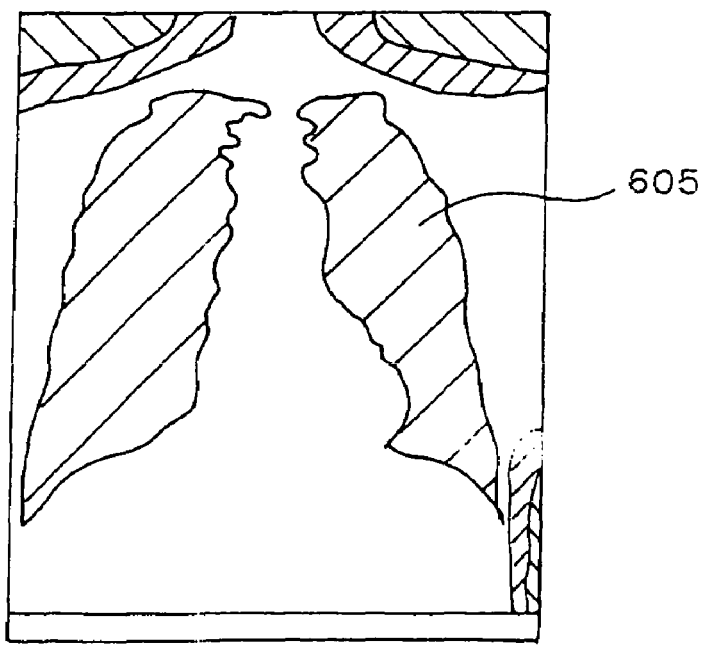
FIG. 36 is an explanatory view of the map data preparation processing procedure.

(6) Based on the positional information on the image and threshold value processing "left lung" 605 is obtained (FIG. 36).

Figure 37:
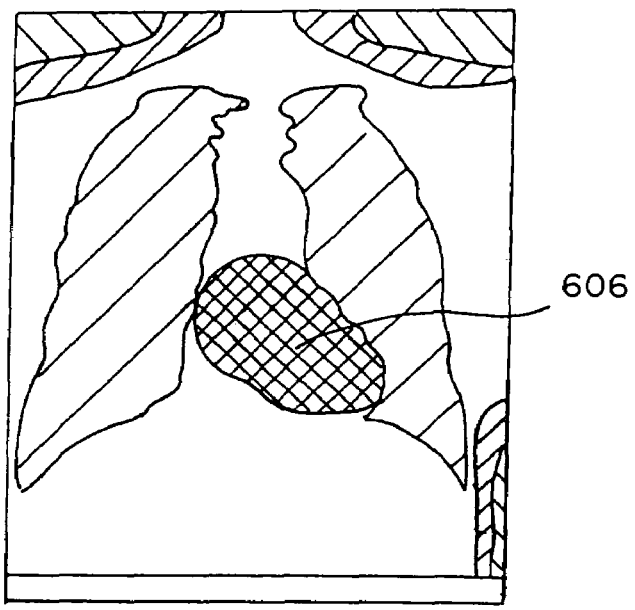
FIG. 37 is an explanatory view of the map data preparation processing procedure.

(7) From the positional information on the image and dimensional information that the part is held between the left and right lungs "heart" 606 is obtained (FIG. 37).

Figure 38:
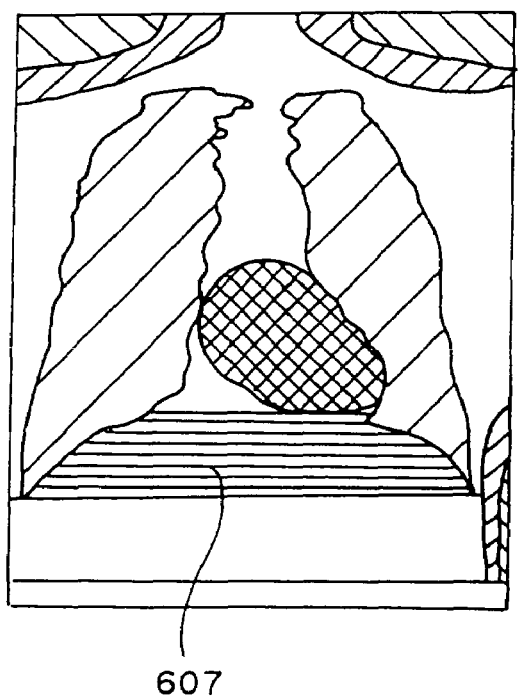
FIG. 38 is an explanatory view of the map data preparation processing procedure.

(8) Based on the positional information on the image "diaphragm" 607 is obtained (FIG. 38).

Figure 39:
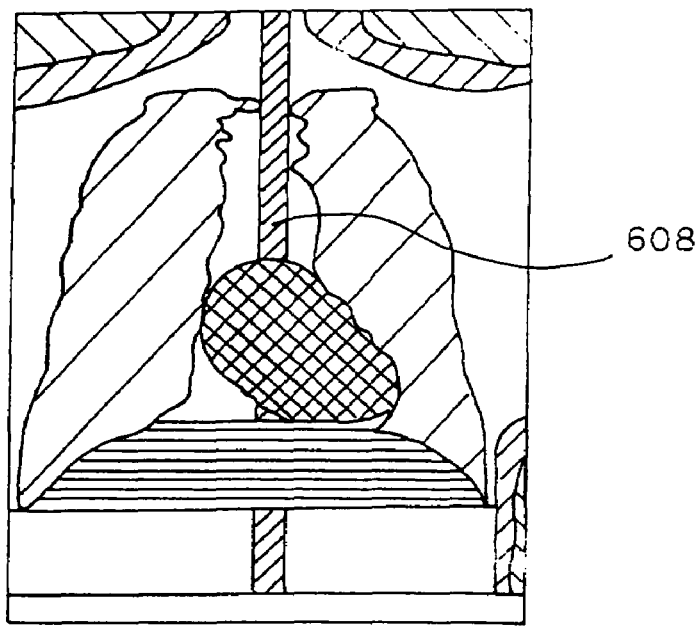
FIG. 39 is an explanatory view of the map data preparation processing procedure.

(9) Based on the positional information on the image "spinal cord" 608 is obtained (FIG. 39).

Figure 40:
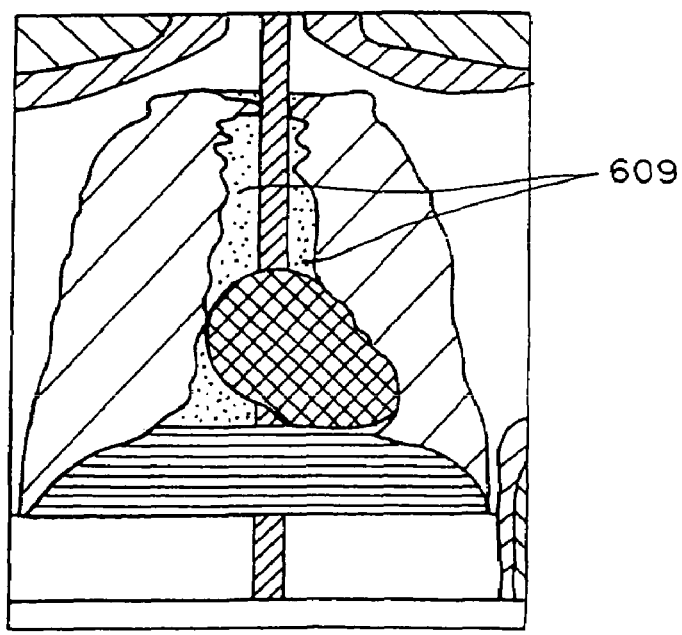
FIG. 40 is an explanatory view of the map data preparation processing procedure.

(10) Based on the positional information on the image "mediastinum" (except the spinal cord and heart) 609 is obtained (FIG. 40).

Figure 41:
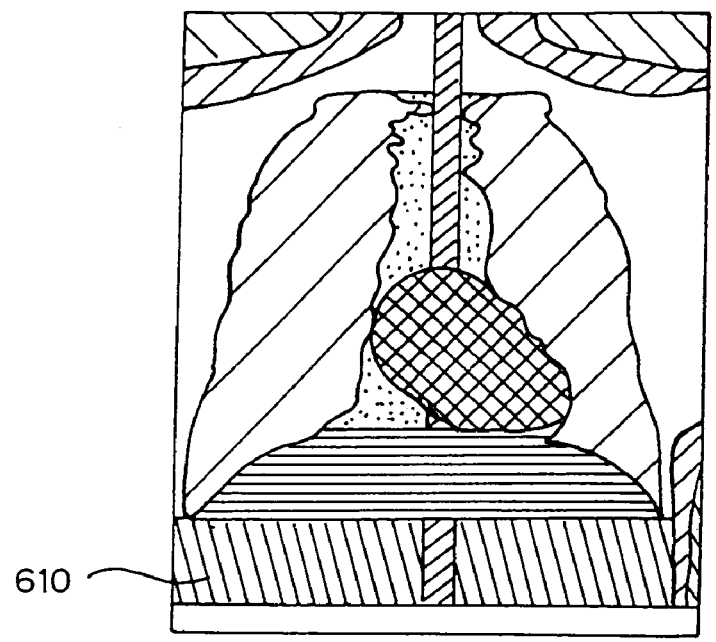
FIG. 41 is an explanatory view of the map data preparation processing procedure.

(11) Based on the positional information on the image "abdomen" 610 is obtained (FIG. 41).

Figure 42:
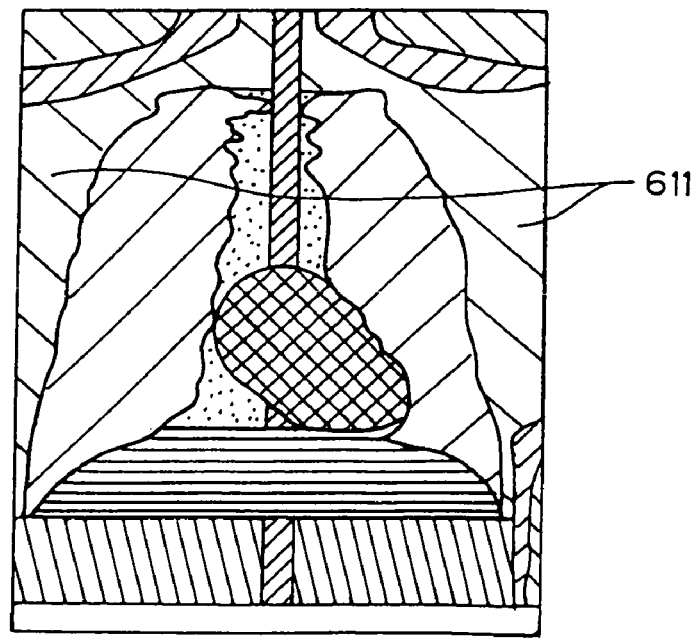
FIG. 42 is an explanatory view of the map data preparation processing procedure.

(12) Based on the positional information on the image "right shoulder", "right armpit", "left shoulder", "left armpit" (area 611) is obtained (FIG. 42). FIG. 42 integrally shows the area 611, but a lower ⅓ part of the area shows the armpit and an upper ⅔ part shows the shoulder, and the respective areas of "right shoulder", "right armpit", "left shoulder", "left armpit" are geometrically divided.

In step j1 of FIG. 30, by these measures, the map data of the respective parts is obtained.

In step j2 of FIG. 30, the part corresponding to the center coordinate point of the area of interest is recognized.

In the present embodiment, the image which is easily observed by the user is displayed as described above.

Additionally, in the aforementioned embodiment, mainly the examples of the medical image on the radiograph have been described, but the present invention is not limited to the radiograph, and the present invention can be applied, for example, to the medical image by an ultrasonic diagnosis device, a medical image by a stomach camera, a medical image by MRI, and various other medical images.

As described above, according to the present invention, the appropriate image processing is always performed irrespective of the medical image type and the image high in diagnosis ability can constantly be provided.

What is claimed is:

1. An image processing apparatus for subjecting a medical image to an image processing by using a photography device, comprising:

a data obtaining section to obtain the medical image, and to identify the photography device and photography conditions used to obtain the medical image;

an image processing condition storing section to store image processing conditions that correspond respectively to various photography devices and photography conditions such that each image processing condition corresponds to a single photography device;

an image processing section to read from said image processing condition storing section the image processing condition corresponding to the photography device and photography conditions used to obtain the medical image, and to subject the medical image obtained by said data obtaining section to the image processing in accordance with the image processing condition read by the image processing section an image display section to display the medical image subjected to the image processing by said image processing section; and an interested area designating section to designate an area of interest on the medical image displayed in said image display section in response to an operation, wherein said image display section lowers a luminance of an area, excluding the area of interest designated by said interested area designating section, to display the medical image said image processing section subjects the medical image obtained by said data obtaining section to at least a gradation conversion processing and a frequency emphasis processing, said image processing condition storing section stores a gradation conversion function used for the gradation conversion processing in accordance with the type of the photography device and target; and a frequency emphasis function used for the frequency emphasis processing and indicating a degree of frequency emphasis in which an average density around respective points of the medical image is used as a variable in accordance with the type of the photography device and the photography condition, gradation conversion processing and frequency emphasis processing are performed differently for different photography devices and different photography conditions, the image processing section performs gradation conversion processing based on a plurality of gradation processing parameters that are individually input by a user, each gradation processing parameter relating to how a different aspect of an original image is translated Into a revised image, said interested area designating section designates the area of interest on the medical image displayed in said image display section and designates a coefficient indicating a degree of drop of the luminance of the area, excluding the area of interest, in response to the operation, and said image display section lowers the luminance of the area, excluding the area of interest designated by said interested area designating section, down to a luminance in accordance with the coefficient designated by said interested area designating section to display the medical image.

2. The image processing apparatus according to claim 1, wherein, before the gradation conversion processing, said image processing section subjects the medical image, obtained by said data obtaining section, to a luminance correction processing using a dynamic range compression function in which the average density around the respective points of the medical image is used as the variable.

3. The image processing apparatus according to claim 1, further comprising:

an image processing condition operating section to add, to change, and to delete said image processing condition in response to an operation.

4. The image processing apparatus according to claim 1, further comprising:

a part recognizing section to recognize positions of a plurality of parts appearing in the medical image, wherein said image processing section subjects the area of interest, designated by said interested area designating section, to the image processing in accordance with a respective one of the plurality of parts appearing in the area of interest, and being among the plurality of parts having positions thereof which are recognized by said part recognizing section.

5. The image processing apparatus according to claim 1, wherein said image display section arranges and displays a plurality of medical images, and
said image display section applies a common area of interest as that of the area of interest designated by said interested area designating section with respect to one medical image among the plurality of medical images displayed in the image display section to the plurality of medical images, and in each of the medical images lowers a luminance of a common area, excluding the common area of interest to display the plurality of medical images.

6. The image processing apparatus according to claim 1, further comprising:
a scanning processing designating section to designate, in response to an operation, a scanning processing to set an area of interest on the medical image displayed in said image display section and to move the area of interest in a predetermined direction,
wherein said image display section displays, in accordance with the scanning processing by said scanning processing designating section, the medical image in which the area of interest successively moves, and a luminance of an area, excluding the area of interest, is lowered.

7. The image processing apparatus according to claim 6, further comprising:
a part recognizing section to recognize positions of a plurality of parts appearing in the medical image,
wherein said image processing section subjects the area of interest, which is successively moved, to the image processing in accordance with a respective one of the plurality of parts appearing in the area of interest, which is successively moved, and being among the plurality of parts having positions thereof which are recognized by said part recognizing section.

8. The image processing apparatus according to claim 6, wherein said image display section arranges and displays, in accordance with the scanning processing by said scanning processing designating section, a plurality of medical images each having a common area of interest, which is common between the plurality of medical images, the common areas being set at corresponding positions and with corresponding timings and synchronously moved at corresponding speeds.

9. The image processing apparatus according to claim 1, wherein said data obtaining section obtains a radiation image as said medical image.

10. An image processing method to subject a medical image to an image processing by using an imaging device, comprising:
obtaining the medical image;
identifying the imaging device and imaging conditions used to obtain the medical image;
storing image processing conditions corresponding respectively to various imaging devices and imaging conditions such that each image processing condition corresponds to a single imaging device;
subjecting the obtained medical image to image processing in accordance with the image processing condition corresponding to the imaging device and the imaging conditions used to obtain the medical image;
displaying the medical image subjected to the image processing;
designating an area of interest on the displayed medical image in response to an operation; and
lowering a luminance of an area, excluding the area of interest, to display the medical image, wherein
the medical image obtained is subjected to at least a gradation conversion processing and a frequency emphasis processing,
a frequency emphasis function is performed in which gradation conversion function and an average density around respective points of the medical image are used as variables in accordance with the type of the imaging device and the imaging conditions,
gradation conversion processing and frequency emphasis processing are performed differently for different imaging devices and different imaging conditions,
gradation conversion processing is performed by individually changing a plurality of gradation processing parameters, each gradation processing parameter relating to how a different aspect of an original image is translated into a revised image,
in designating the area of interest on the displayed medical image, a coefficient is designated indicating a degree of drop of the luminance of the area, excluding the area of interest, in response to the operation, and
the luminance of the area, excluding the area of interest, is reduced in accordance with the coefficient, to display the medical image.

11. An image processing program embodied on a computer readable storage medium to operate a computer system to subject a medical image to an image processing, which medical image was obtained using an imaging device, wherein said image processing program comprises:
a data obtaining section to obtain the medical image, and identify the imaging device and imaging conditions used to obtain the medical image;
a condition storing section to store image processing conditions corresponding respectively to various imaging devices and imaging conditions such that each image processing condition corresponds to a single imaging device;
an image processing section to subject the medical image to image processing in accordance with an image processing condition corresponding to the imaging device and imaging conditions used to obtain the medical image;
an image display section to display the medical image subjected to the image processing by said image processing section; and
an interested area designating section to designate an area of interest on the medical image displayed in said image display section in response to an operation, wherein
said image display section lowers a luminance of an area, excluding the area of interest designated by said interested area designating section, to display the medical image,
said image processing section subjects the medical image obtained by said data obtaining section to at least a gradation conversion processing and a frequency emphasis processing,
said condition storing section stores a gradation conversion function used for the gradation conversion processing in accordance with the type of the imaging device and target; and a frequency emphasis function used for the frequency emphasis processing and indicating a degree of frequency emphasis in which an average density around respective points of the medical image is used as a variable in accordance with the type of the imaging device and the imaging condition, gradation conversion processing and frequency emphasis processing are performed differently for different imaging devices and different imaging conditions, the image processing section performs gradation conversion processing based on a plurality of gradation processing parameters that are individually input by a user, each gradation processing parameter relating to how a different aspect of an original image is translated into a revised image, said interested area designating section designates the area of interest on the medical image displayed in said image display section and designates a coefficient indicating a degree of drop of the luminance of the area, excluding the area of interest, in response to the operation, and said image display section lowers the luminance of the area, excluding the area of interest designated by said interested area designating section, down to a luminance in accordance with the coefficient designated by said interested area designating section to display the medical image.

* * * * *

UNITED STATES PATENT AND TRADEMARK OFFICE
CERTIFICATE OF CORRECTION

PATENT NO. : 7,324,673 B1  Page 1 of 1
APPLICATION NO. : 09/714292
DATED : January 29, 2008
INVENTOR(S) : Takatoshi Yamanaka et al.

It is certified that error appears in the above-identified patent and that said Letters Patent is hereby corrected as shown below:

Column 28, Line 38, change "Into" to --into--.

Signed and Sealed this

Fifteenth Day of July, 2008

JON W. DUDAS
*Director of the United States Patent and Trademark Office*